(12) United States Patent
Fujii et al.

(10) Patent No.: US 11,442,216 B2
(45) Date of Patent: *Sep. 13, 2022

(54) LIGHTING DEVICE, WINDOW WITH A LIGHTING FUNCTION, AND BUILDING PRODUCT FOR A WINDOW

(71) Applicant: Mitsubishi Electric Corporation, Tokyo (JP)

(72) Inventors: Yusuke Fujii, Tokyo (JP); Satoru Okagaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/432,097

(22) PCT Filed: Feb. 26, 2020

(86) PCT No.: PCT/JP2020/007631
§ 371 (c)(1),
(2) Date: Aug. 19, 2021

(87) PCT Pub. No.: WO2020/175523
PCT Pub. Date: Sep. 3, 2020

(65) Prior Publication Data
US 2022/0196904 A1 Jun. 23, 2022

(30) Foreign Application Priority Data
Feb. 27, 2019 (JP) .............................. JP2019-034613

(51) Int. Cl.
*F21V 8/00* (2006.01)
*F21V 9/40* (2018.01)
(Continued)

(52) U.S. Cl.
CPC .............. *G02B 6/0041* (2013.01); *F21V 9/40* (2018.02); *F21V 15/01* (2013.01); *F21Y 2115/10* (2016.08)

(58) Field of Classification Search
CPC ......... G02B 6/0041; F21V 9/40; F21V 15/01; F21Y 2115/10
See application file for complete search history.

(56) References Cited

U.S. PATENT DOCUMENTS

| 2008/0186726 A1* | 8/2008 | Okada ................. | B60Q 1/0041 362/509 |
| 2010/0014022 A1* | 1/2010 | Nagata ................. | G02B 6/0041 362/606 |

(Continued)

FOREIGN PATENT DOCUMENTS

| JP | 2011-191339 A | 9/2011 |
| JP | 2012-49050 A | 3/2012 |

(Continued)

OTHER PUBLICATIONS

International Search Report and Written Opinion dated Apr. 14, 2020, received for PCT Application PCT/JP2020/007631, Filed on Feb. 26, 2020, 8 pages including English Translation.

(Continued)

Primary Examiner — Tsion Tumebo
(74) Attorney, Agent, or Firm — Xsensus LLP

(57) ABSTRACT

A lighting device includes a first light source to emit first light; a diffuser to receive the first light and emits first scattered light; and a frame to support the first light source and the diffuser. The diffuser includes nanoparticles, and guides the received first light, scatters it with the nanoparticles, and emits it as the first scattered light. The diffuser includes an incident surface to receive the first light, a first surface on which an emission surface to emit the first scattered light is formed, and a second surface opposite the (Continued)

first surface. The incident surface is at a first edge portion of the diffuser, the frame is opened to expose at least a portion of a region on the first surface of the diffuser in which the emission surface is formed and a region on the second surface corresponding thereto.

19 Claims, 19 Drawing Sheets

(51) Int. Cl.
    *F21V 15/01*  (2006.01)
    *F21Y 115/10*  (2016.01)

(56) References Cited

U.S. PATENT DOCUMENTS

| | | | |
|---|---|---|---|
| 2011/0194270 A1* | 8/2011 | Di Trapani | F21V 9/08 362/147 |
| 2011/0249939 A1 | 10/2011 | Schmidt et al. | |
| 2012/0306861 A1* | 12/2012 | Minami | G02B 30/30 362/602 |
| 2013/0307420 A1 | 11/2013 | Yoder et al. | |
| 2014/0140091 A1* | 5/2014 | Vasylyev | G02B 6/0065 362/606 |
| 2016/0084459 A1 | 3/2016 | Sciascia et al. | |
| 2017/0051893 A1 | 2/2017 | Di Trapani | |
| 2017/0257925 A1 | 9/2017 | Forbis et al. | |
| 2018/0188442 A1 | 7/2018 | Wang et al. | |
| 2018/0246270 A1* | 8/2018 | Di Trapani | F21S 8/006 |
| 2021/0190279 A1 | 6/2021 | Fujii et al. | |

FOREIGN PATENT DOCUMENTS

| | | |
|---|---|---|
| JP | 2014-49261 A | 3/2014 |
| JP | 2015-207554 A | 11/2015 |
| JP | 2017-152397 A | 8/2017 |
| JP | 2017-216107 A | 12/2017 |
| JP | 2018-188055 A | 11/2018 |
| WO | 2011/030284 A1 | 3/2011 |
| WO | 2019/220656 A1 | 11/2019 |

OTHER PUBLICATIONS

Extended European Search Report dated Mar. 7, 2022, in corresponding European Patent Application 20763539.2, 9 pp.
Office Action issued in corresponding Japanese Patent Application No. 2021-502303, dated Jun. 14, 2022, 10 pp.

* cited by examiner

LIGHTING DEVICE, WINDOW WITH A LIGHTING FUNCTION, AND BUILDING PRODUCT FOR A WINDOW

CROSS-REFERENCE TO RELATED APPLICATIONS

The present application is based on PCT filing PCT/JP2020/007631, filed Feb. 26, 2020, which claims priority to and the benefit of Japanese Patent Application No. 2019-034613, filed on Feb. 27, 2019, the entire disclosure of each are incorporated herein by reference. This application is related to U.S. patent application Ser. No. 17/054,175, entitled LIGHTING UNIT AND LIGHTING FIXTURE, filed on Nov. 10, 2020 and is hereby incorporated by reference.

TECHNICAL FIELD

The present disclosure relates to a lighting device, a window with a lighting function, and a building product for a window.

BACKGROUND ART

As an example of a lighting device that simulates the natural sky, there is a lighting system described in Patent Literature 1. The lighting system described in Patent Literature 1 includes a first light source (2) and a lamp shade-like structure (10). The lamp shade-like structure (10) includes a screen structure (14) and a bottom unit (12), and the bottom unit (12) includes a diffused light generator (20). The diffused light generator (20) operates as a Rayleigh diffuser, substantially does not absorb light in the visible range, and diffuses short-wavelength components of the impinging light more efficiently than long-wavelength components of the impinging light. The first light source (2) and lamp shade-like structure (10) are provided within a dark box (16). The first light source (2) is vertically and horizontally displaced with respect to the center of the diffused light generator (20), and illuminates a top surface of the diffused light generator (20) in its entirety at an angle of about 60 degrees, referred to as a main light beam angle.

CITATION LIST

Patent Literature

Patent Literature 1: Japanese Patent Application Publication No. 2015-207554

SUMMARY OF INVENTION

Technical Problem

However, when it is intended to not only use the lighting system described in Patent Literature 1 as a lighting device but also use it, for example, as a window when it is turned off, there are the following problems. Firstly, the lighting system described in Patent Literature 1 has a problem in that since the first light source and a member supporting it are provided on a back side (which is a side opposite an emitting direction of illumination light, and also referred to as a back surface side) of the diffused light generator, it is not possible to make the back surface side of the diffused light generator open (free from any light blocking object).

Secondly, the lighting system described in Patent Literature 1 has a problem in that since it employs a backlight system, the haze of the diffused light generator in a thickness direction thereof needs to be high, and if it were possible to make the back surface side open, it would be difficult to apply the lighting system to a window, because of poor visibility or translucency with respect to a space on the back surface side of the diffused light generator. A reason why the haze of the diffused light generator in the thickness direction is high in the backlight system is because a high particle concentration is needed to generate a divergent light portion (scattered light simulating the blue sky) in a light guiding path having a short length (substantially equal to the thickness) from incidence of light from the first light source through the back surface of the diffused light generator to emission of the light through the front surface. Another reason is to prevent a user from perceiving the light source unit (equipment) behind the diffused light generator.

In a lighting device that reproduces the color (such as a transparent blue color) of a natural sky, such as a blue sky, by using Rayleigh scattering, it is not sufficient to merely diffuse or scatter incident white light, like a so-called white lighting, and it is necessary to perform light control so that emitted scattered light makes the light emission surface look like the natural sky. More specifically, it is necessary to diffuse or scatter light of blue wavelengths at an appropriate (not too high and not too low) ratio relative to light of the other wavelengths, on the basis of the scattering probability that has wavelength dependence and depends on the particle diameter and the particle concentration. Such light control can allow the light emitting body to be seen as a light emitter with a color like the natural sky (with a sense of depth).

Thus, when it is intended to use a lighting device that simulates the natural sky, also as a window, in addition to being switchable between a lighting function and a window function (a function of allowing a person to see, through a member separating spaces, from one of the spaces in which the person is present, the opposite space that is the space opposite thereto, or a function of introducing light from the opposite space), it is important how much it can provide both reproducibility of the sky at the time of using the lighting function and visibility of the opposite space or translucency at the time of using the window function.

In view of the above problems, the present disclosure is intended to provide a lighting device, a window with a lighting function, and a building product for a window that are switchable between a lighting function and a window function and capable of providing both reproducibility of the sky at the time of use for lighting and visibility of the opposite space or translucency at the time of use as a window.

Solution to Problem

A lighting device according to the present disclosure includes: a first light source to emit first light; a diffuser to receive the first light and emit first scattered light; and a frame to support the first light source and the diffuser, wherein the diffuser includes nanoparticles, and guides the received first light, scatters the first light with the nanoparticles, and emits the first light as the first scattered light, the diffuser includes an incident surface to receive the first light, a first surface on which an emission surface to emit the first scattered light is formed, and a second surface opposite the first surface, the incident surface is formed at a first edge portion of the diffuser, the frame is opened to expose at least a portion of a region on the first surface of the diffuser in which the emission surface is formed and a region on the second surface corresponding thereto, and a correlated color temperature of the first scattered light is higher than a correlated color temperature of the first light.

Also, a window with a lighting function according to the present disclosure is used as a window of a building or a mobile body, and includes: a diffuser to receive first light and emit first scattered light; and a frame to support the diffuser, wherein the diffuser includes nanoparticles, and guides the received first light, scatters the first light with the nanoparticles, and emits the first light as the first scattered light, the diffuser includes an incident surface to receive the first light, a first surface on which an emission surface to emit the first scattered light is formed, and a second surface opposite the first surface, the incident surface is formed at a first edge portion of the diffuser, the frame is opened to expose at least a portion of a region on the first surface of the diffuser in which the emission surface is formed and a region on the second surface corresponding thereto, and a correlated color temperature of the first scattered light is higher than a correlated color temperature of the first light.

Also, a building product for a window according to the present disclosure includes: a first light source to emit first light; a diffuser to receive the first light and emit first scattered light; and a frame to support the first light source and the diffuser, wherein the diffuser includes nanoparticles, and guides the received first light, scatters the first light with the nanoparticles, and emits the first light as the first scattered light, the diffuser includes an incident surface to receive the first light, a first surface on which an emission surface to emit the first scattered light is formed, and a second surface opposite the first surface, the incident surface is formed at a first edge portion of the diffuser, the frame is opened to expose at least a portion of a region on the first surface of the diffuser in which the emission surface is formed and a region on the second surface corresponding thereto, and a correlated color temperature of the first scattered light is higher than a correlated color temperature of the first light.

Advantageous Effects of Invention

According to the present disclosure, it is possible to provide a lighting device, a window with a lighting function, and a building product for a window that are switchable between a lighting function and a window function and capable of providing both reproducibility of the sky at the time of use for lighting and visibility of the opposite space or translucency at the time of use as a window.

DESCRIPTION OF EMBODIMENTS

Embodiments of lighting devices, windows with lighting functions, and building products for windows according to the present disclosure will be described below with reference to the drawings. The following embodiments are merely examples, and it is possible to combine embodiments as appropriate and to modify each embodiment as appropriate.

In each drawing described below, elements may be shown on different scales. Also, in each embodiment described below, to facilitate explanation, coordinate axes of an xyz orthogonal coordinate system may be shown in drawings. In this case, a main emission direction that is a direction in which scattered light simulating the sky is mainly emitted from a light emitting body in a lighting function is taken as the −y axis direction. Also, of the directions perpendicular to the main emission direction, a direction closer to a traveling direction of light incident on the light emitting body is taken as the z axis direction.

Here, the main emission direction can be replaced with a normal direction of a main light emitting surface of the light emitting body. The main light emitting surface refers to a particularly designated surface of emission surfaces provided in the light emitting body. More specifically, the main light emitting surface should be a surface that is one of one or more emission surfaces of the light emitting body that are surfaces for emitting illumination light and is particularly intended to be seen by a user as a light emitting surface that simulates the sky. For example, when the light emitting body has a plate shape, the main light emitting surface is one of two surfaces connected by a side surface. Here, the plate shape is a shape having two surfaces connected by a side surface. Also, for example, when the light emitting body has a rod shape, the main light emitting surface is one or part of side surface(s) of the column body. Here, the rod shape is a shape of a column body having two bases connected by side surface(s). Rod is a general term for column bodies. Also, for example, when it is installed as a window, the main light emitting surface is a surface whose normal direction is directed toward a room interior. The main light emitting surface is not limited to a flat surface, and may be curved or include one or more inclined surfaces, for example. In such cases, the normal direction of the main light emitting surface may be a normal direction of a central portion or a normal direction of a tangent plane.

First Embodiment

A first embodiment will be first described with reference to the drawings.
<Configuration of Lighting Device 200>

Figure 1:
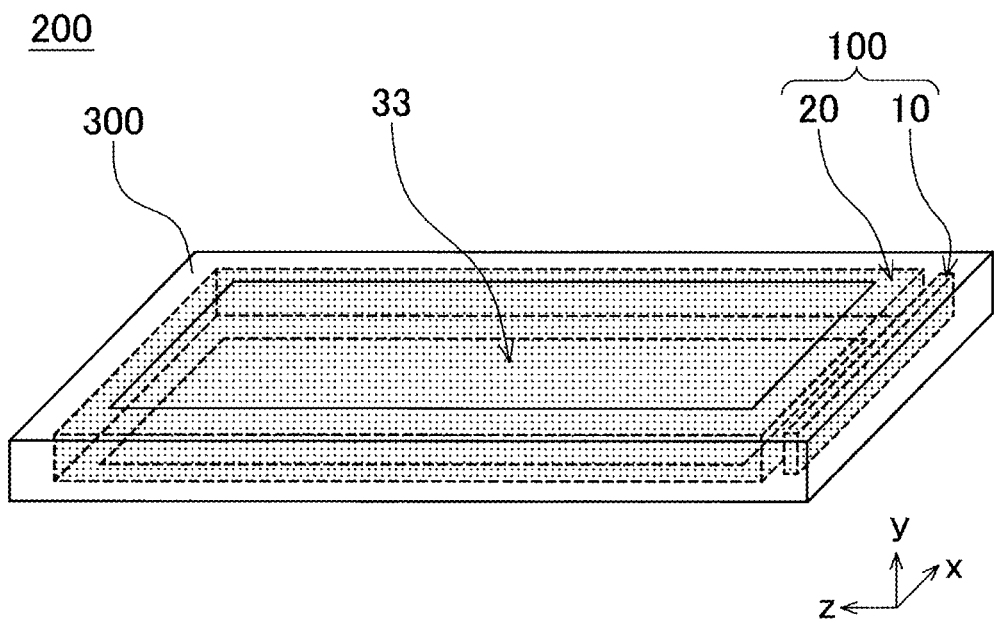
FIG. 1 is a perspective view illustrating a general configuration of a lighting device according to a first embodiment.
Figure 2:
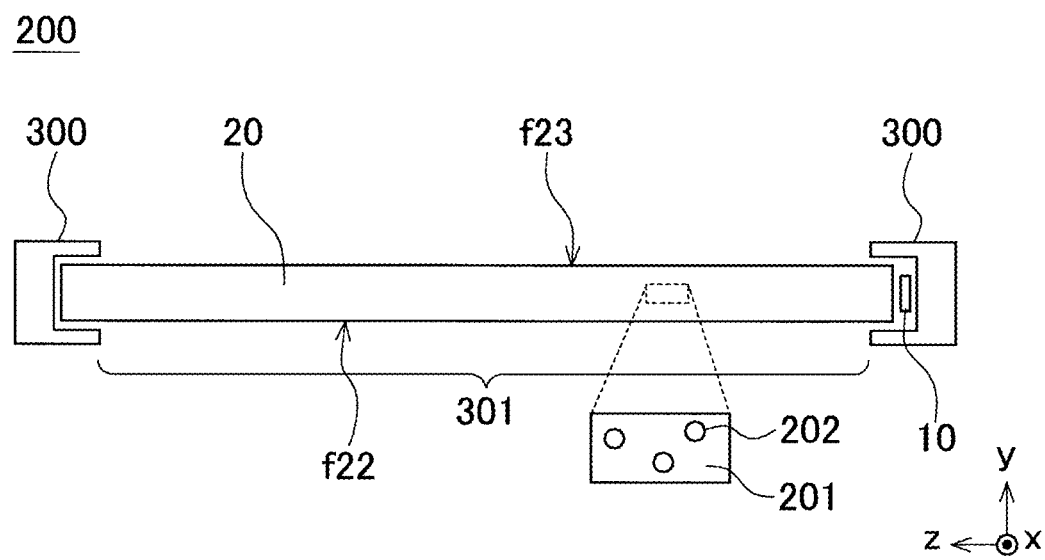
FIG. 2 is a cross-sectional view illustrating the general configuration of the lighting device according to the first embodiment.

FIGS. 1 and 2 are configuration diagrams illustrating a general configuration of a lighting device 200 according to the present embodiment. FIG. 1 is a perspective view illustrating the general configuration of the lighting device 200, and FIG. 2 is a cross-sectional view illustrating the general configuration of the lighting device 200. The lighting device 200 according to the present embodiment is also referred to as a window 200 with a lighting function.

The lighting device 200 includes one or more light sources 10, a diffuser 20 as a light emitting body, and a frame 300. Hereinafter, the diffuser 20 and the one or more light sources 10 paired with the diffuser 20 may be referred to collectively as a lighting unit 100. Thus, the lighting unit 100 is the pair of the light sources 10 and diffuser 20.

For convenience of explanation, the following description assumes that the y axis direction is a thickness direction (up-down direction) of the diffuser 20, the z axis direction is a lateral direction (left-right direction), and the x axis direction is a longitudinal direction (front-rear direction). However, the above directions do not necessarily coincide with directions in an actual installed state.

In the example illustrated in FIG. 2, the main light emitting surface is a surface f22. In this example, when the lighting function is used, light from the light sources 10 is incident on an edge portion of the surface f22 of the diffuser 20 in the +z axis direction, and scattered light generated due to the scattering effect of the diffuser 20 is emitted through the surface f22, thereby allowing the diffuser 20 to be seen as a light emitter that emits light close to that from the natural sky. The main light emitting surface may be part of the surface f22. Also, the main light emitting surface may be formed on the surface f22. Reference character 33 in FIG. 1 denotes an opening on a back surface side corresponding to a region 301 on the surface f22 of the diffuser 20 in which the main light emitting surface is formed.

Hereinafter, light emitted by the light sources 10 may be referred to as first light or light Li. Scattered light simulating the sky emitted from the diffuser 20 may be referred to as light Ls, scattered light Ls, or diffused light Ls. Also, hereinafter, light guided in the diffuser 20 may be referred to as light Lt or transmitted light Lt.

As described later, in the diffuser 20, the number of emission surfaces through which light Ls is emitted is not limited to one. For example, light Ls can be emitted also through a surface f23 opposite the surface f22.

<<Light Source 10>>

Figure 3A:
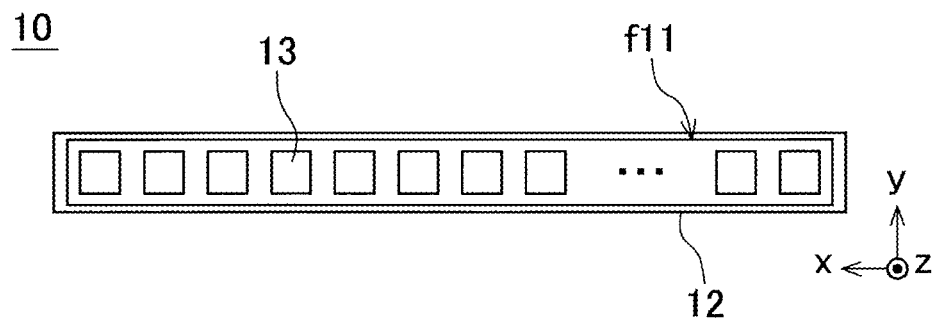
FIGS. 3A and 3B are explanatory diagrams illustrating a general configuration of a light source according to the first embodiment.
Figure 3B:
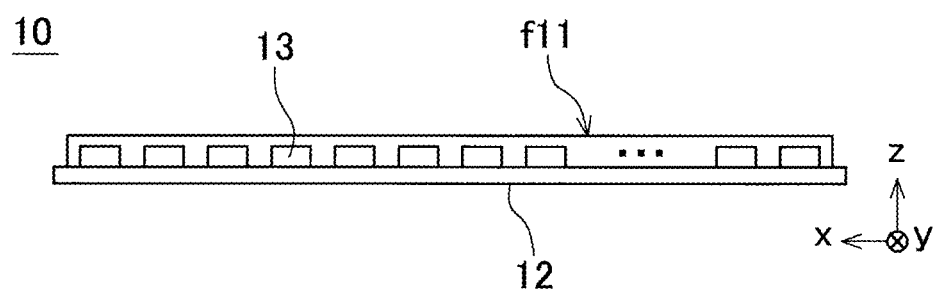
Figure 4:
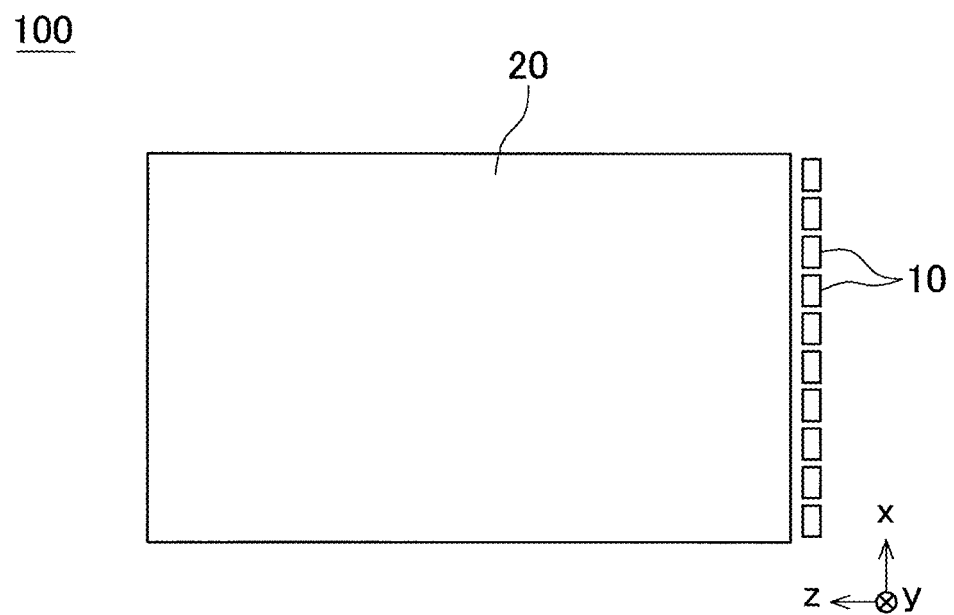
FIG. 4 is an explanatory diagram illustrating an arrangement example of light sources according to the first embodiment.

FIGS. 3A and 3B are configuration diagrams each illustrating a general configuration of a light source according to the first embodiment. Also, FIG. 4 is a configuration diagram illustrating an arrangement example of light sources according to the first embodiment. The light sources 10 may be, for example, LED light sources. Each light source 10 may include a substrate 12 and one or more LED elements 13, as illustrated in FIGS. 3A and 3B. In the example illustrated in FIGS. 3A and 3B, multiple LED elements 13 are provided. Also, the LED elements 13 are arranged on the substrate 12. The LED elements are an example of light emitting elements.

The light sources 10 are provided to face an edge surface of the diffuser 20 forming the edge portion of the surface f22 in which the main light emitting surface is formed. For example, each light source 10 includes a light emitting surface f11 that emits light Li incident on the diffuser 20, and is disposed so that the light emitting surface f11 faces the edge surface of the diffuser 20 forming the edge portion of the surface f22 in which the main light emitting surface is formed.

As illustrated in FIG. 4, the lighting device 200 may include multiple light sources 10 for one diffuser 20. Here, it is assumed that a unit of light sources 10 is a unit for which on/off control, emitted light amount control, or emitted light color control can be independently performed. The lighting device 200 may include, as the lighting unit 100, only one light source 10 for one diffuser 20.

Hereinafter, a group of light sources 10 (which may be one light source 10) that emits, to one diffuser 20, incident light for generating light Ls simulating the sky may be referred to collectively as a light source unit 10'.

Also, hereinafter, a function of the light sources 10 constituting the lighting unit 100 may be described with the light source unit 10' as a subject. In this case, the function can be taken as a function of each light source 10 included in the lighting unit 100, or taken as a function of the combination of the light sources 10 included in the lighting unit 100.

As an example, in the configuration example of a light source 10 illustrated in FIGS. 3A and 3B, it is possible to take the light source 10 in the drawing as a light source unit 10' and take each LED element 13 in the drawing as a light source 10. In this case, it is possible that one light source 10 has the configuration of the light source 10 illustrated in FIGS. 3A and 3B. Also, in the arrangement example of the light sources 10 illustrated in FIG. 4, it is possible to take the light source unit 10' in the drawing as one light source 10 and take each light source 10 included in the light source unit 10' in the drawing as an LED element 13.

The light source unit 10' emits light Li that is incident light on the diffuser 20. The light source unit 10' emits white light as light Li, for example. Also, the light source unit 10' may emit, as light Li, light having a predetermined correlated color temperature Tci, for example.

The correlated color temperature Tci is, for example, 6500 K. Also, the correlated color temperature Tci is, for example, 5000 K. The correlated color temperatures of lights emitted by the respective light sources 10 may be the same or different.

The color of light Li emitted from the light sources 10 may be a color other than white. For example, the light sources 10 may include a white light source and a green light source. Also, the light sources 10 may include a white light source, a green light source, and an orange light source. Also, the light sources 10 may include white light sources having different color temperatures.

Here, the difference in color temperature between a white color having a high color temperature and a white color having a low color temperature is, for example, 8800 K. The correlated color temperature of the white color having the high color temperature is, for example, 14400 K. The correlated color temperature of the white color having the high color temperature is, for example, 11500 K or higher. Also, the correlated color temperature of the white color having the high color temperature is, for example, 19000 K or lower. The correlated color temperature of the white color having the low color temperature is, for example, 5600 K. The correlated color temperature of the white color having the low color temperature is, for example, 5500 K or higher. Also, the correlated color temperature of the white color having the low color temperature is, for example, 6050 K or lower.

The light sources 10 not only may be disposed to face one edge surface forming the edge portion of the surface f22 in which the main light emitting surface is formed, as illustrated in FIG. 4, but also may be disposed to face two or more edge surfaces forming the edge portion. Even in such a case, anything serving as a light source that causes light Li to enter through the edge portion of the single diffuser 20 is taken as a light source 10 of the present embodiment, i.e., a light source 10 constituting the light source unit 10' for the diffuser 20.

For example, the light sources 10 (more specifically, the light emitting surfaces f11 thereof) may be disposed to face at least one of one or more edge surfaces of the diffuser 20 forming the edge portion of the surface f22 in which the main light emitting surface is formed. Also, for example, multiple light sources 10 may be disposed along at least one of the one or more edge surfaces of the diffuser 20 forming the edge portion of the surface f22 in which the main light emitting surface is formed.

Figure 5:
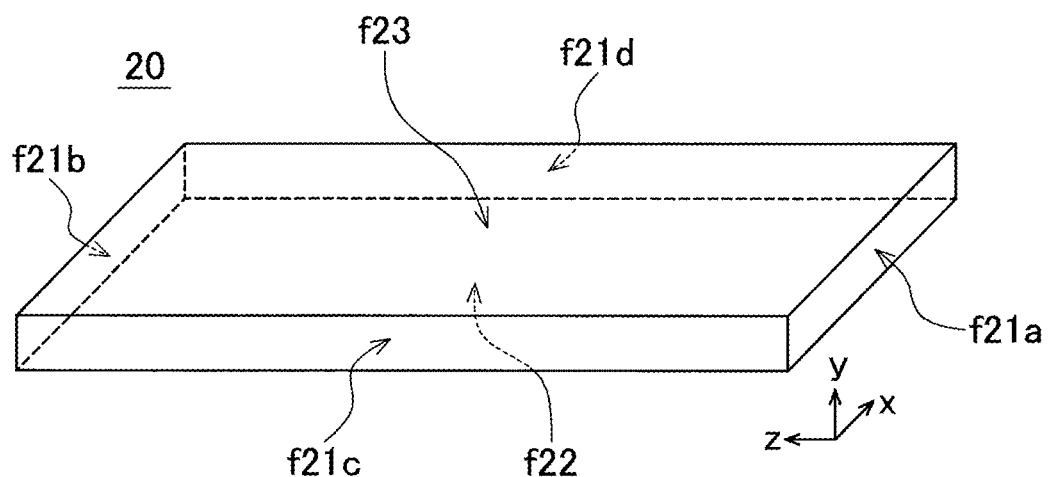
FIG. 5 is a perspective view illustrating an example of a diffuser according to the first embodiment.

FIG. 5 is a perspective view illustrating an example of the diffuser 20. For example, when the diffuser 20 has a plate shape having main surfaces having rectangular perimeters, as illustrated in FIG. 5, and includes four side surfaces (side surfaces f21a, f21b, f21c, and f21d), the light sources 10 may be disposed as follows.

As an example, the light sources 10 may be disposed to face the side surface f21a of the diffuser 20. In this case, multiple light sources 10 may be disposed along the side surface (side surface f21a) of the diffuser 20. Also, as an example, the light sources 10 may be disposed to face the side surfaces f21a and f21b of the diffuser 20. In this case, multiple light sources 10 may be disposed along the side surfaces (side surfaces f21a and f21b) of the diffuser 20. Also, as an example, the light sources 10 may be disposed to face the side surfaces f21a, f21b, and f21c of the diffuser 20. In this case, multiple light sources 10 may be disposed along the side surfaces of the diffuser 20 (the side surfaces f21a, f21b, and f21c of the diffuser 20). Also, as an example, the light sources 10 may be disposed to face the side surfaces f21a, f21b, f21c, and f21d of the diffuser 20. In this case, multiple light sources 10 may be disposed along the side surfaces (side surfaces f21a, f21b, f21c, and f21d) of the diffuser 20.

Also, as an example, the light sources 10 may be disposed to face at least one of the side surfaces f21a, f21b, f21c, and f21d of the diffuser 20. In this case, multiple light sources 10 may be disposed along the at least one side surface (at least one of the side surfaces f21a, f21b, f21c, and f21d) of the diffuser 20.

The shape of the diffuser 20 is not limited to a plate shape having main surfaces having rectangular perimeters. When the shape of the diffuser 20 is another shape, it is possible to apply the above positional relationship between the edge surfaces and the light sources to a certain edge surface while replacing it with another edge surface opposite the certain edge surface, another edge surface adjacent to the certain edge surface, or the like, for example. Also, it is possible to apply the above positional relationship between the edge surfaces and the light sources to a certain part of a continuous side surface while replacing it with another part located opposite the certain part, another part located adjacent to the certain part, or the like, for example.

Also, for example, in view of zero energy building (ZEB), light obtained by guiding external light (such as sunlight) may be used instead of light Li from the light sources 10. In guiding external light, it is possible to use a daylighting member and/or a light guide for introducing external light and emitting it in a predetermined direction. In this case, the lighting unit 100 may include, as a light source 10, such a daylighting member and/or a light guide, for example.

<<Diffuser 20>>

Next, the diffuser 20 will be described with reference to FIGS. 2, 5, and 6.

The diffuser 20 includes a first surface (the surface f22 in the drawings) in which the main light emitting surface is formed, and at least one edge surface (surface f21 in the drawings) forming an edge portion of the first surface. The diffuser 20 may further include a second surface (the surface f23 in the drawings) opposite the first surface. The main light emitting surface may be part of the first surface. Also, the main light emitting surface may be formed on the first surface. An incident surface is formed in the edge surface. The incident surface may be part of the edge surface. Also, the incident surface may be formed on the edge surface. Hereinafter, the first surface may be referred to as the front surface f22, and the second surface opposite thereto may be referred to as the back surface f23. Also, the edge surface may be referred to as the side surface f21.

Figure 6:
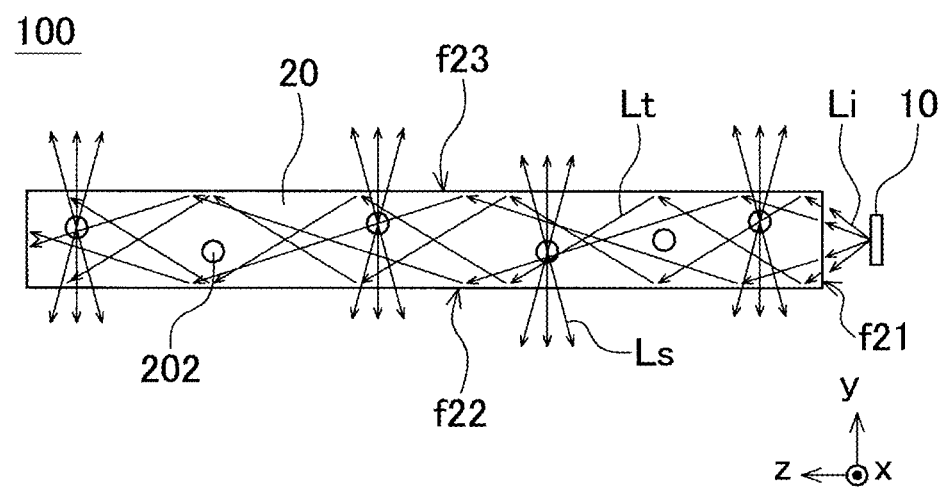
FIG. 6 is an explanatory diagram illustrating an example of guiding of light in the diffuser according to the first embodiment and an example of generation of scattered light simulating the sky.

FIG. 6 is an explanatory diagram illustrating an example of guiding of light Li in the diffuser 20 and an example of generation of light Ls. The diffuser 20 receives light Li emitted by the light sources 10. Also, the diffuser 20 guides the received light Li. Also, the diffuser 20 guides the received light Li as light Lt. Here, "guides" refers to transmitting light entering a medium, along a predetermined optical path in the medium. Thus, the light Lt does not include light scattered or absorbed in the diffuser 20.

More specifically, the diffuser 20 receives light Li emitted from the light sources 10 through the side surface f21, and while guiding it as light Lt inside the diffuser 20, scatters part of it and emits it as light Ls simulating the sky, through at least the front surface f22.

The diffuser 20 includes a base material 201 and particles 202.

The particles 202 are, for example, nanoparticles. "Nanoparticles" refer to particles having a size on the order of nanometers (nm). In general, nanoparticles refer to particles from one to hundreds of nanometers in size. The particles 202 are, for example, particles having a particle diameter on the order of nanometers.

The particles 202 may have a spherical shape or another shape.

The diffuser 20 may include multiple types of particles 202. In this case, the particle diameter of the particles 202 may be an average particle diameter. Also, the diffuser 20 may include, as one of the multiple types of particles 202, particles other than nanoparticles.

The particles 202 are, for example, inorganic oxide particles. Examples of the inorganic oxide include ZnO, $TiO_2$, $ZrO_2$, $SiO_2$, and $Al_2O_3$.

The particles 202 scatter light Li entering the diffuser 20 to generate light Ls. Also, the particles 202 scatter light Lt transmitted in the diffuser 20 to generate light Ls.

The base material 201 contains the particles 202. The particles 202 may be added in the base material 201. The particles 202 are, for example, dispersed in the base material 201.

The base material 201 is not particularly limited, but is, for example, a transparent material. The base material 201 need not necessarily be transparent to all the wavelengths of light Li. As an example, the base material 201 may have absorption at a specific wavelength of the wavelengths of light Li.

The transmittance (in-line transmittance) of the base material 201 per a light guiding distance of 5 mm is preferably 90% or more, more preferably 95% or more, and still more preferably 98% or more, at one or more design wavelengths. Here, the design wavelengths should be predetermined wavelengths of the wavelengths of the incident light. The number of the design wavelengths is not limited to one, and the design wavelengths may be multiple wavelengths or a band of wavelengths (wavelength band). For example, when the incident light is white light, the design wavelengths may be one or more of wavelengths of 450 nm, 550 nm, and 650 nm. The design wavelengths may be three wavelengths of 450 nm, 550 nm, and 650 nm.

The base material 201 is, for example, solid. The base material 201 may be, for example, a resin plate using thermoplastic polymer, thermosetting resin, photopolymerizable resin, or the like. Also, for the resin plate, it is possible to use acrylic polymer, olefin polymer, vinyl polymer, cellulosic polymer, amide polymer, fluorine polymer, urethane polymer, silicone polymer, imide polymer, or the like. The diffuser 20 may be formed by performing hardening treatment on such material for the base material 201 that has not been hardened, with the particles 202 dispersed therein, for example. The base material 201 is not necessarily solid, and may be liquid or liquid crystalline.

Also, a translucent functional coating, such as an antireflection coating, an antifouling coating, a heat shielding coating, or a water repellent finish may be applied to at least one surface of the diffuser 20. Also, in view of the functionality (such as impact resistance, water resistance, or heat resistance) as a window, the diffuser 20 may be sandwiched by two transparent substrates (e.g., glass plates), for example. In this case, the diffuser 20 may be an interlayer of a laminated glass.

The diffuser 20 has, for example, a plate shape. The plate shape is not limited to a flat plate shape. Thus, the plate shape may be a curved shape. For example, the diffuser 20 has a shape such that one or both of the front surface f22 and back surface f23 (the first surface and second surface) is curved. When the front surface f22 and back surface f23 are curved, the directions of the curvatures of both surfaces may be the same or different. For example, both surfaces may be curved surfaces having convex shapes (outwardly convex shapes). Also, for example, both surfaces may be curved surfaces having concave shapes (inwardly convex shapes). Also, for example, it is possible that one of the surfaces is a curved surface having a convex shape and the other of the surfaces is a curved surface having a concave shape. Also, the diffuser 20 may include, on part of its surface, a slope, a step, a recess, a projection, or the like. The above relationship between the front surface f22 and the back surface f23 can apply to, for example, the relationship between opposite side surfaces.

The diffuser 20 has, for example, a rod shape. The rod shape is not limited to a shape, such as a cylinder, a quadrangular prism, or a triangular prism, that is rectangular in a cross-section parallel to an extending direction of the column body, or a shape such that a perimeter of the column body is constant in a height direction. The extending direction of the column body is, for example, the z axis direction when it is assumed that a base of the column body is the surface f21a in FIG. 5. Examples of the rod shape also include shapes equivalent to plate shapes. In this case, a rod shape such that the bases of the column body correspond to the main surfaces of a plate shape and at least one of the bases is the main light emitting surface can be taken as a plate shape.

When the diffuser 20 has a rod shape, an extending direction of the column body is set in the z axis direction. The y axis direction, which is an axial direction parallel to the main emission direction, is set in a normal direction of a side surface of the column body. Thus, the main light emitting surface is set to be part of the side surface of the column body. Also, the incident surface is set to be at least one of the bases of the column body. When the diffuser 20 has a rod shape, a region of the side surface of the column body in which the main light emitting surface is formed may be taken as the first surface. Then, a region of the side surface of the column body opposite the first surface may be taken as the second surface. Also, the two bases of the column body may be taken as a side surface. The side surface may further include a region of the side surface of the column body other than the first surface or second surface.

A top view shape (which is a shape on the xz plane in the drawings, and will be referred to below as a front shape) of the diffuser 20 is not particularly limited. For example, the front shape of the diffuser 20 may be a rectangular shape, a polygonal shape, a circular shape, a western barrel shape, or a spool shape, and besides, may be a shape obtained by connecting two or more straight lines, a shape obtained by connecting two or more arcs, a shape obtained by connecting one or more straight lines and one or more arcs, or the like.

Also, side view shapes (which are shapes on the xy plane and yz plane, and will be referred to below as side shapes) of the diffuser 20 are not particularly limited. For example, each side shape of the diffuser 20 may be a rectangular shape, a western barrel shape, or a spool shape, and besides, may be a shape obtained by connecting four or more straight lines including two opposite straight lines, a shape obtained by connecting two or more straight lines including two opposite straight lines and two or more arcs, or the like.

As an example, the diffuser 20 according to the first embodiment is described below as having a plate shape.

The side surface f21 (edge surface) receives light Li emitted by the light sources 10. The side surface f21 is disposed to face the light emitting surfaces f11 of the light sources 10, for example.

The front surface f22 (first surface) emits light Ls scattered by the particles 202. Also, the front surface f22 may emit light Lt guided in the diffuser 20. For example, the front surface f22 may emit light reaching an edge portion opposite the incident surface after being guided in the diffuser 20, as light reproducing the sunlight.

Also, the back surface f23 (second surface) may emit light Ls scattered by the particles 202. Also, the back surface f23 may emit light Lt guided in the diffuser 20. For example, the back surface f23 may emit light reaching an edge portion opposite the incident surface after being guided in the diffuser 20, in order to prevent stray light.

The back surface f23 is opposite the front surface f22. Light Lt entering the diffuser 20 is reflected and guided by the front surface f22 and back surface f23. The light Lt is guided, for example, by total reflection. For example, the light Lt is guided in the diffuser 20.

Also, a surface other than the front surface f22 and back surface f23 may emit light Ls scattered by the particles 202. Also, a surface other than the front surface f22 and back surface f23 may emit light Lt guided in the diffuser 20.

<<Frame 300>>

The frame 300 will be described below with reference to the drawings.

The frame 300 supports at least the diffuser 20. The frame 300 may be, for example, a structural body that holds the edge portion of the diffuser 20 or supports the diffuser 20 with part of the edge portion of the diffuser 20 covered thereby.

Also, the frame 300 may be a structural body that supports the light sources 10 in addition to the diffuser 20. The frame 300 may be, for example, a structural body that, while holding the edge portion of the diffuser 20 or supporting the diffuser 20 with part of the edge portion of the diffuser 20 covered thereby, fixes and supports the light sources 10 at positions where the light sources 10 face the incident surface of the diffuser 20.

Figure 7A:
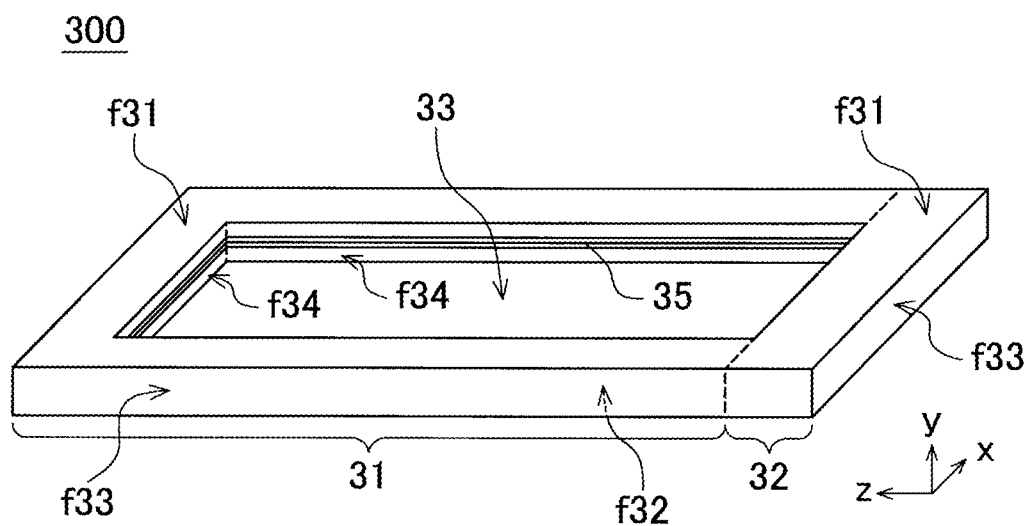
FIGS. 7A and 7B are perspective views illustrating an example of a frame according to the first embodiment.
Figure 7B:
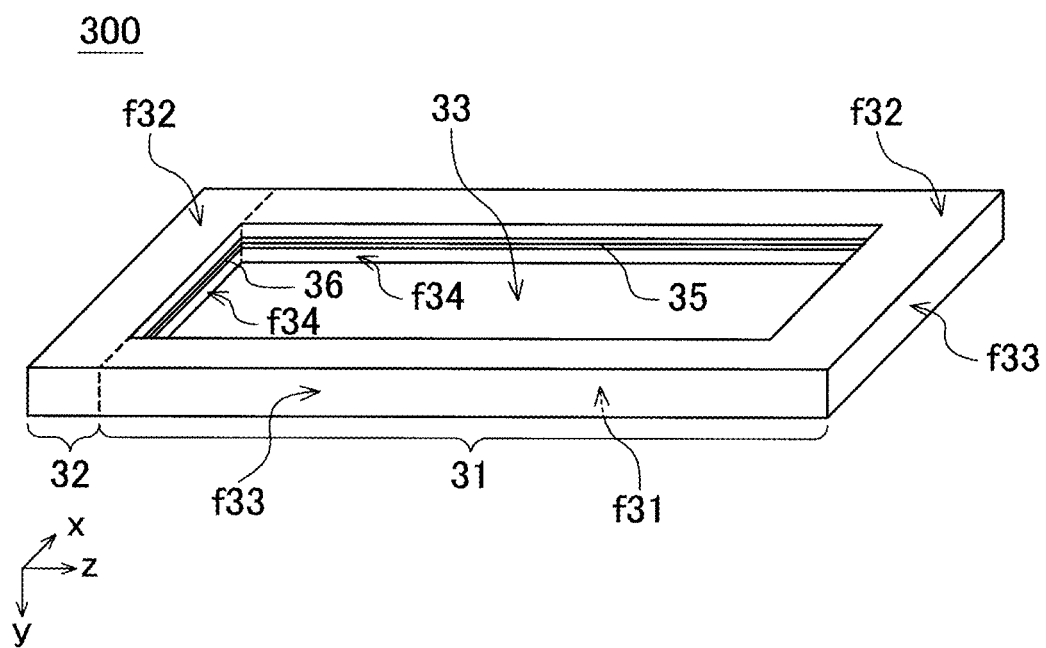
Figure 8:
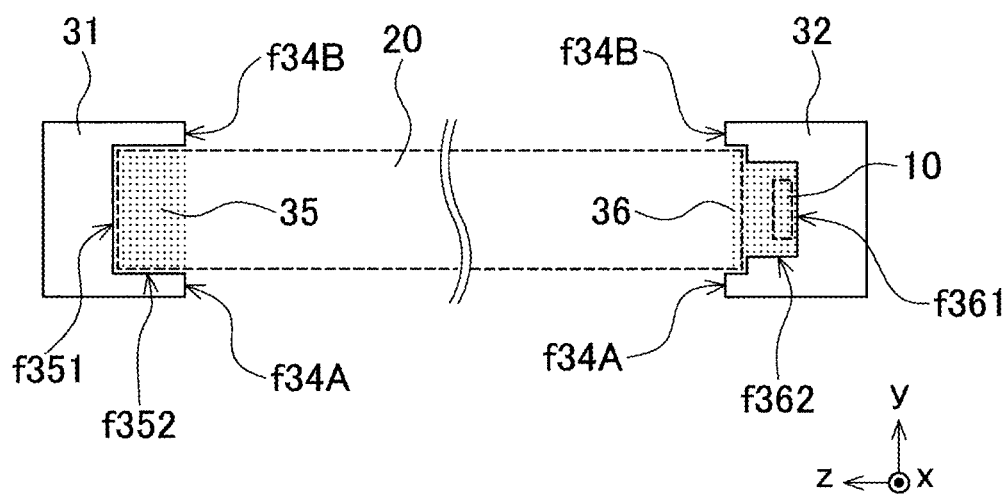
FIG. 8 is a cross-sectional view illustrating the example of the frame according to the first embodiment.

FIGS. 7A and 7B are perspective views illustrating an example of the frame 300. In FIGS. 7A and 7B, only the frame 300 is extracted and illustrated. FIG. 7A is a perspective view from the +y axis direction side, and FIG. 7B is a perspective view from the −y axis direction side. In the following description, also in the frame 300, the main emission direction of the diffuser 20, which is a supported object, is taken as the −y axis direction. Also, of the directions perpendicular to the main emission direction, a direction closer to a traveling direction of the light incident on the diffuser 20 is taken as the z axis direction. FIG. 8 is a cross-sectional view of the frame 300 illustrated in FIGS. 7A and 7B. FIG. 8 is a yz cross-sectional view of the frame 300 at a center of the frame 300 in the x axis direction.

The frame 300 may, for example, include a first frame portion and a second frame portion that are separable from each other. For example, the frame 300 may include a frame portion 31 as the first frame portion that supports the diffuser 20, and a frame portion 32 as the second frame portion that supports the light sources 10, and be configured to support the diffuser 20 and light sources 10 while fixing their respective positions, by means of the frame portions 31 and 32. The frame portion 31 is disposed, for example, at an edge portion of the diffuser 20 other than an edge portion at which the incident surface is formed. Also, the frame portion 32 is disposed, for example, at the edge portion of the diffuser 20 in which the incident surface is formed. The frame portion 32 is disposed, for example, so that the light emitting surfaces f11 of the light sources 10 face the incident surface of the diffuser 20 in a state of being supported by the frame portion 31.

The frame portion 31 is configured so that it can be opened to expose at least a predetermined region including at least part of the main light emitting surface on the first surface of the diffuser 20 and a region on the second surface opposite the predetermined region (which will be referred to below collectively as the "window regions" 301) in an assembled state. Here, "can be opened" indicates that it should be opened in at least one of one or more usage states of the lighting device.

As illustrated in FIGS. 7A and 7B, it is possible that, in an assembled state, the frame 300 includes a first surface (surface f31 in the drawings) and a second surface (surface f32 in the drawings) opposite thereto, and both the first surface and second surface include openings 33 corresponding to the window regions 301 of the diffuser 20. For example, the frame portion 31 is configured to support an edge surface of the diffuser 20 or a region of the diffuser 20 other than the window regions 301 of the first surface and second surface. Here, the first surface is a surface of the diffuser 20 facing in the main emission direction. The second surface is a surface opposite the first surface.

The openings 33 may include a region other than the window regions 301. In other words, the openings 33 need not correspond to the window regions 301 on a one-to-one basis, and should at least include the window regions 301. In cases such as when an edge surface of the diffuser 20 is sloped, the positions and sizes of the opening 33 of the first surface and the opening 33 of the second surface need not necessarily be the same as viewed from above.

Also, the frame 300 includes an inner surface f34 and an outer surface f33. Also, the inner surface f34 forms a groove 35 and a groove 36 (see the shading indications in FIG. 8). The diffuser 20 and light sources 10 are supported by the grooves 35 and 36 formed in the inner surface f34 of the frame 300, for example.

For example, it is possible that the frame portion 31 includes the inner surface f34 in which the groove 35 is formed, and the groove 35 accommodates an edge portion of the diffuser 20 in a state in which it is opened to expose the window regions 301 of the diffuser 20. The groove 35 may support the diffuser 20 in contact with at least one of the edge surface (side surface f21), the first surface (front surface f22), and the second surface (back surface f23) of the diffuser 20. A space between the diffuser 20 and the groove 35 may be filled with buffer material. The space between the diffuser 20 and the groove 35 may be filled with packing covering the edge portion of the diffuser 20, for example. The packing is preferably uncolored. The space between the diffuser 20 and the groove 35 may be filled with sealing material or back-up material, for example.

Also, the inner surface f34 of the frame portion 31 may include an inner surface f34A defining the window region 301 on the first surface of the diffuser 20 and an inner surface f34B defining the window region 301 on the second surface of the diffuser 20 (see FIG. 8). The groove 35 may be any groove capable of supporting the diffuser 20, and a cross-sectional shape thereof may be, for example, U-shaped or L-shaped. For example, the groove 35 may be shaped to expose a surface (the surface f23) of the diffuser 20 on the +y axis direction side, or shaped to expose a surface (the surface f22) of the diffuser 20 on the −y axis direction side. Also, the groove 35 may include, in a bottom surface f351 or a side surface f352, a step or a slope.

For example, it is possible that the frame portion 32 includes the inner surface f34 in which the groove 36 is formed, and the groove 36 accommodates the light sources 10 in a state in which it is opened to expose at least the light emitting surfaces f11 of the light sources 10. The groove 36 may support the light sources 10 in contact with at least one of side surfaces and bottom surfaces of the light sources 10, the substrates 12, or the light source unit 10'.

Also, the inner surface f34 of the frame portion 32 may include an inner surface f34A defining the window region 301 on the first surface of the diffuser 20 and an inner surface f34B defining the window region 301 on the second surface of the diffuser 20.

Also, the groove 36 may include a bottom surface f361. The light sources 10 are provided, for example, on the bottom surface f361 of the groove 36. The light sources 10 may be provided on the bottom surface f361 with thermal conductive material, such as thermal conductive grease or a metal plate, therebetween.

The groove 36 may be any groove capable of supporting the light sources 10, and its shape is not particularly limited. For example, a cross-sectional shape of the groove 36 may be, for example, U-shaped or L-shaped. For example, the groove 36 may be L-shaped to expose surfaces of the light sources 10 on the +y axis direction side or −y axis direction side.

Also, the groove 36 may be configured to support an edge portion of the diffuser 20 in which the incident surface is formed, in addition to the light sources 10. For example, the frame portion 32 may support the diffuser 20 with part of a side surface f362 of the groove 36 in contact with at least one of an edge surface forming an edge portion in which the incident surface is formed, the first surface, and the second surface of the diffuser 20. For example, the groove 36 may include a step on the side surface f362 to support the diffuser 20. Also, a space between the diffuser 20 and the side surface supporting the diffuser 20 may be, for example, filled with packing covering the edge portion of the diffuser 20, as with the groove 35.

Figure 9:
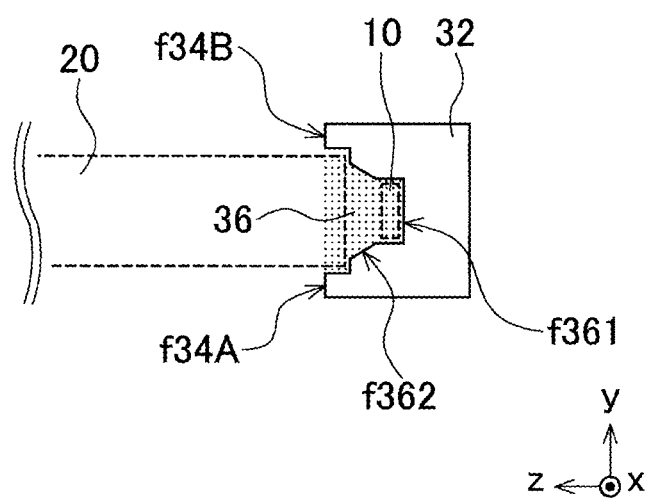
FIG. 9 is a cross-sectional view illustrating an example of the frame according to the first embodiment.

FIG. 9 is a cross-sectional view illustrating another example of the frame 300. FIG. 9 illustrates, of the frame 300, only the frame portion 32 disposed at an edge portion of the diffuser 20 in which the incident surface is formed. The groove 36 of the frame portion 32 may include a slope or a curved surface on the side surface f362. The example illustrated in FIG. 9 is an example in which part of the side surface f362 of the groove 36 is sloped. Part of the side surface of the groove 36 (other than the part supporting the diffuser 20) may form a reflecting surface or light collection cone that collects light Li from the light sources 10 to the incident surface of the diffuser 20.

In the frame 300, the frame portions 31 and 32 may be formed integrally or separately. In cases such as when it is intended to provide the light sources 10 at multiple edge portions of the diffuser 20, the frame 300 may include one or more frame portions 32 corresponding to edge portions of the diffuser 20 at which the light sources 10 are provided.

When the frame portions 31 and 32 are separately formed, the frame 300 may be configured, for example, so that the frame portion 32 supporting the light sources 10 is attachable to and detachable from the frame portion 31 supporting the diffuser 20. Also, the frame 300 may be configured so that the positions of the frame portion 31 supporting the diffuser 20 and the frame portion 32 supporting the light sources are changed, for example, like a sash and a window frame of an openable window. In such a case, the frame portions 31 and 32 support the diffuser 20 and light sources 10 so that the light sources 10 are disposed at an edge portion of the diffuser 20 in at least one usage state.

Figure 10:
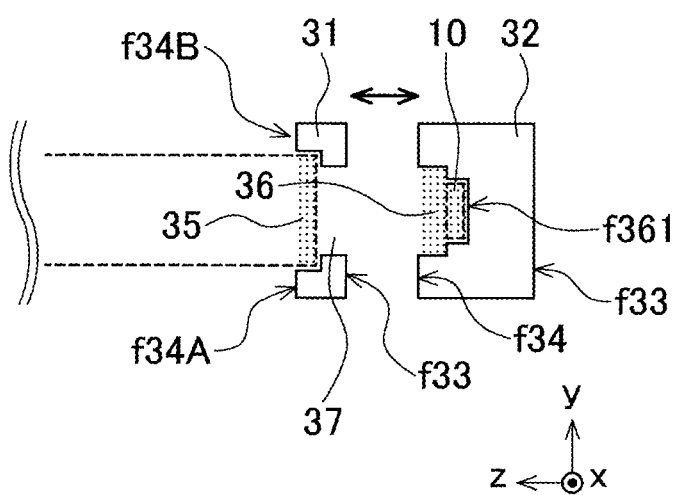
FIG. 10 is a cross-sectional view illustrating an example of the frame according to the first embodiment.

FIG. 10 is a cross-sectional view illustrating another example of the frame 300. FIG. 10 illustrates, of the frame 300, only the frame portions 31 and 32 provided at an edge portion of the diffuser 20 in which the incident surface is formed. In the example illustrated in FIG. 10, the frame portions 31 and 32 are separately formed. In the example illustrated in FIG. 10, the frame portion 31 is provided also at the edge portion of the diffuser 20 in which the incident surface is formed. In the frame portion 31 provided at the edge portion of the diffuser 20 in which the incident surface is formed, the bottom surface f351 of the groove 35 provided in the inner surface f34 is opened. Thus, the groove 35 of the frame portion 31 may include an opening 37 in the bottom. The opening 37 is provided, for example, at a position facing a region of the diffuser 20 in which the incident surface is formed. In this case, the light sources 10 supported by the frame portion 32 cause light Li to be incident on the diffuser 20 through the opening 37 of the frame portion 31. FIG. 10 illustrates an example in which a distance between the frame portions 31 and 32 is variable in the z axis direction. In the frame 300, the frame portions 31 and 32 may be fixed in contact with each other. Also, only the frame portion 31 may be taken as the frame 300 of a window with a lighting function or a first building product for a window. In this case, the frame portion 32 may be treated as a frame of a second building product for a window corresponding to such a window with a lighting function or a first building product for a window.

Figure 11A:
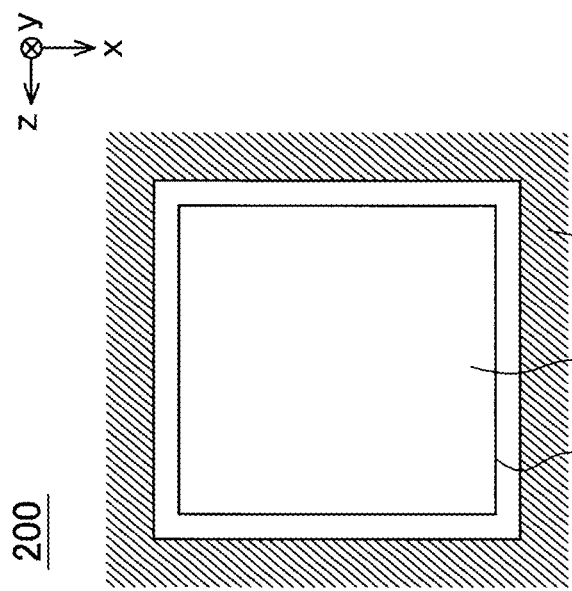
FIGS. 11A to 11E are explanatory diagrams illustrating installation examples of the lighting device according to the first embodiment.
Figure 11B:
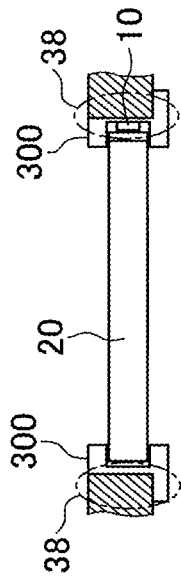
Figure 11C:
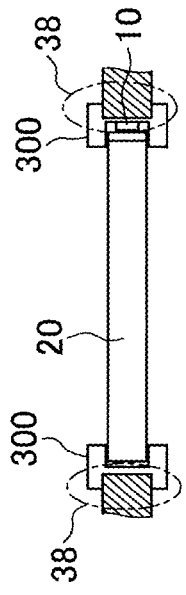
Figure 11D:
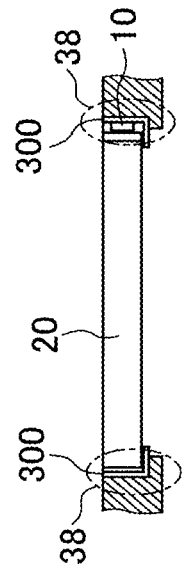
Figure 11E:
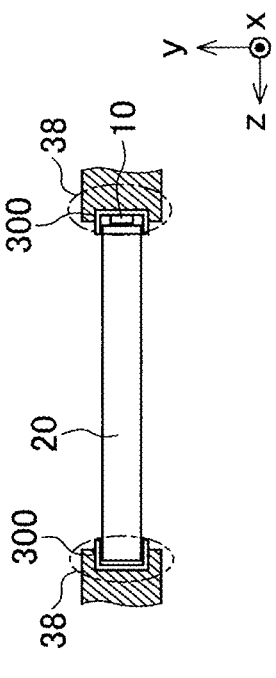

FIGS. 11A to 11E are explanatory diagrams illustrating installation examples of the lighting device 200 including the frame 300. FIG. 11A is a top view schematically illustrating the lighting device 200 installed in an installation body 40. Also, FIGS. 11B to 11E are cross-sectional views schematically illustrating the lighting device 200 installed in the installation body 40. As illustrated in FIGS. 11B to 11E, the frame 300 may include a joint 38 for fitting and fixing the lighting device 200 into the installation body 40. Here, "fixing" refers to supporting without coming off. The joint 38 is provided, for example, at an edge portion of the first surface f31, an edge portion of the second surface f32, or the outer surface f33 of the frame 300.

The joint 38 fixes the lighting device 200 in an opening provided in the installation body 40 in contact with at least one surface (e.g., a side surface, a surface in the −y axis direction, or a surface in the +y axis direction) of an edge portion forming the opening, for example.

The joint 38 may have various shapes depending on the manner of use of the lighting device 200.

When the lighting device 200 not only provides the lighting function, but also is used, for example, as a skylight or lighting window (so-called fix window) that is always closed, the frame 300 may include the joint 38 to fix the lighting device 200 in a ceiling, wall, door, or the like as the installation body 40, or a window frame provided therein. For example, the joint 38 may be a projection or groove having a shape fitted to the shape of an edge portion forming an opening in which the lighting device 200 is installed in the installation body 40. The frame 300 of the lighting device 200 and a member forming an opening in which the lighting device 200 is installed in the installation body 40 may be integrated.

Figure 12A:
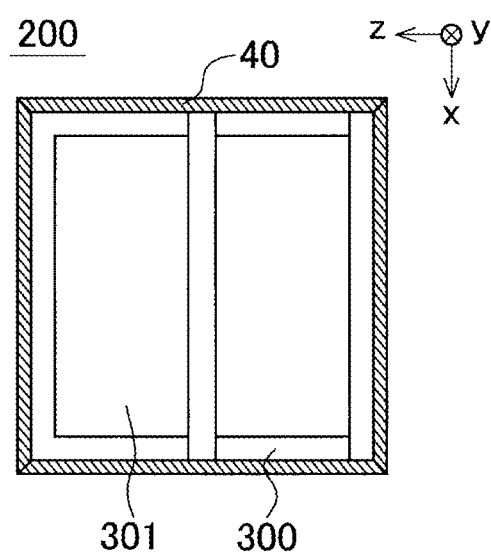
FIGS. 12A and 12B are explanatory diagrams illustrating an example of the frame according to the first embodiment.
Figure 12B:
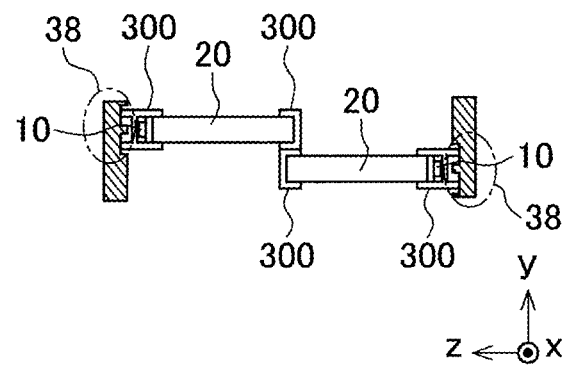
Figure 13A:
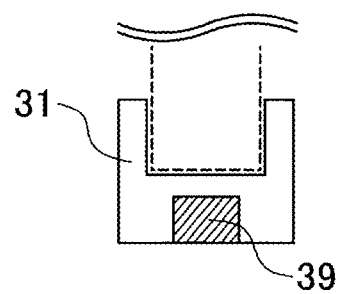
FIGS. 13A to 13D are cross-sectional views each illustrating an example of the frame according to the first embodiment.
Figure 13B:
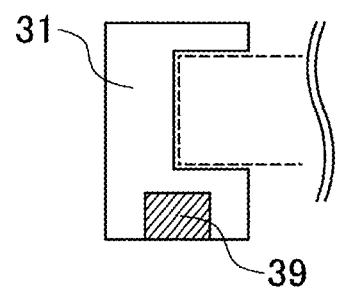
Figure 13C:
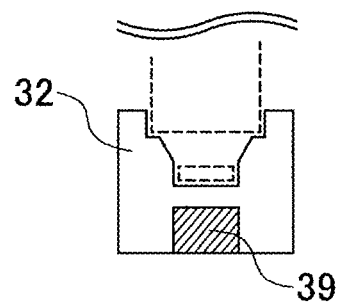
Figure 13D:
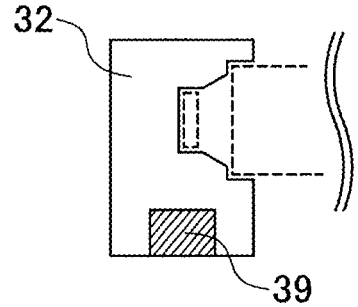

FIGS. 12A, 12B, and 13A to 13D are explanatory diagrams illustrating examples of the frame 300 (in particular the joint 38). FIGS. 12A and 12B are explanatory diagrams illustrating another installation example of the lighting device 200 including the frame 300. FIG. 12A is a top view schematically illustrating the lighting device 200 installed in the installation body 40. Also, FIG. 12B is a cross-sectional view schematically illustrating the lighting device 200 installed in the installation body 40.

As illustrated in FIGS. 12A and 12B, for example, when the lighting device 200 not only provides the lighting function, but also is used, for example, as a sliding window, such as a double sliding window or a single hung window, that horizontally or vertically slides to open, the joint 38 may be provided to support the lighting device 200 slidably in a certain direction in a window frame as the installation body 40. For example, the frame 300 may include, as the joint 38, a projection or groove having a shape fitted to the shape of a projection or groove provided in the window frame.

FIGS. 13A to 13D are cross-sectional views each illustrating an example of the frame 300. FIGS. 13A to 13D each illustrate a principal part of the frame 300 in an enlarged manner. The frame 300 may include, for example, a groove 39 that accommodates a sash roller corresponding to a rail provided in a window frame, as the joint 38. The groove 39 is provided, for example, in an outer surface of the frame 300 that makes a bottom surface in an installed state. The joint 38 may include the groove 39 and a sash roller (whose illustration is omitted) accommodated in the groove 39.

Also, for example, when the lighting device 200 not only provides the lighting function, but also is used, for example, as a window, such as a projected window, that is opened and closed about a certain axis, the frame 300 may include, as the joint 38, a friction stay in which an arm slides depending on the opening/closing state, a hinge portion, or the like.

The surfaces of the grooves (such as the grooves 35, 36, and 39, and the groove as the joint 38) provided in the frame 300 may be mirror surfaces. Also, the surfaces of the grooves may be, for example, light absorbers. Also, the surfaces of the grooves may be, for example, light diffusing reflectors.

Besides the above, the lighting device 200 of the present embodiment is also applicable to various types of windows, such as a window that is folded to open, a two action window, or a window that is inclined to open. The frame 300 and the joint 38 provided in the frame 300 may have various shapes depending on the type of the window to which the lighting device 200 is applied.

Figure 14:
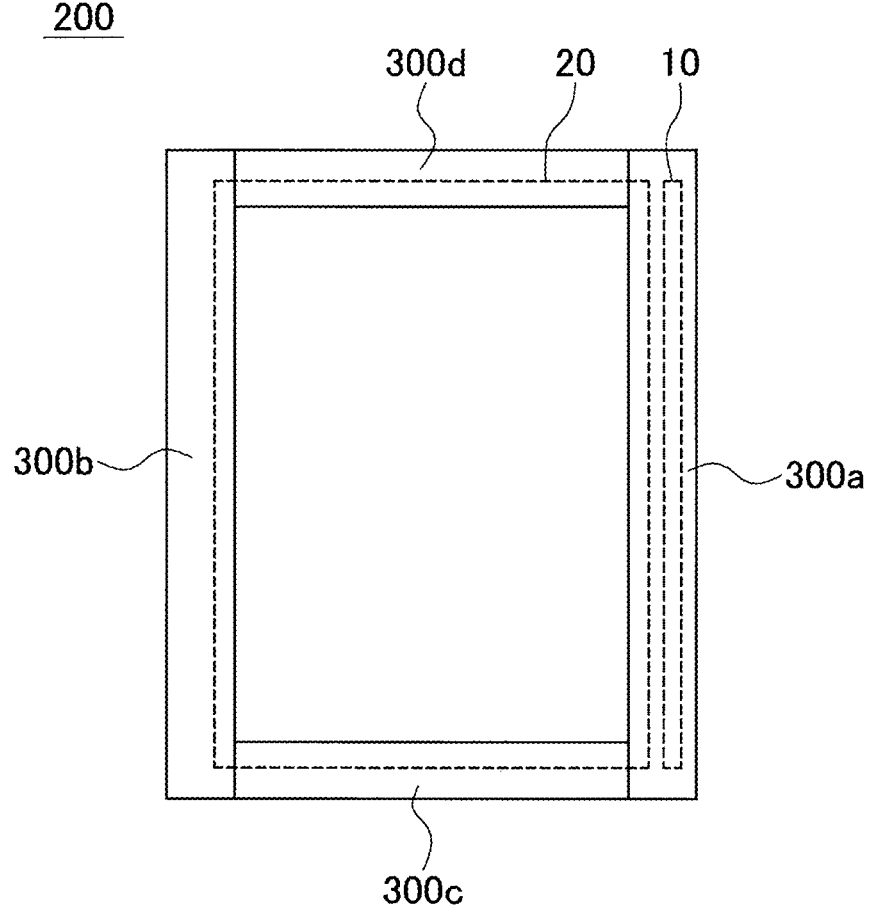
FIG. 14 is a plan view illustrating an example of the frame according to the first embodiment.
Figure 15:
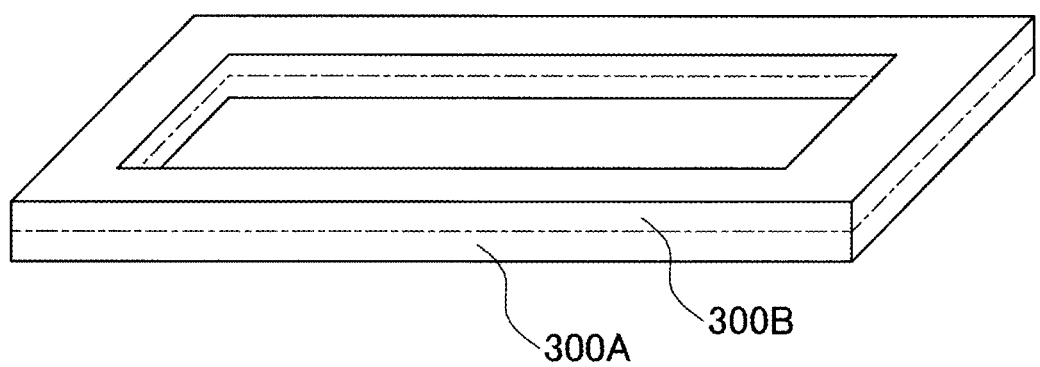
FIG. 15 is a perspective view illustrating an example of the frame according to the first embodiment.

FIGS. 14 and 15 are explanatory diagrams each illustrating an example of the frame 300. For example, the frame 300 may be a frame portion of a so-called framed door. In this case, the diffuser 20 is equivalent to at least one of panels of the framed door. For example, the frame 300 may be separable into four frames (frames 300a, 300b, 300c, and 300d) as illustrated in FIG. 14. Moreover, the frame 300 may be separable into, for example, two frames (frames 300A and 300B) in the thickness direction of the diffuser 20 as illustrated in FIG. 15. The frame may be separable without being limited to a framed door.

Also, for example, when the frame 300 is separated into two or more frames, it may be configured so that a first frame (e.g., the frame portion 31) supports the diffuser 20 and a second frame (e.g., the frame portion 32) supports the light sources 10. In this case, the first and second frames include fitting portions (such as a recess and a projection, or a rail portion and a sash roller) for fitting them to each other. Also in this case, the positional relationship between the light sources 10 and the diffuser 20 may be set so that the light sources 10 are located to face the side surface f21 of the diffuser 20 in at least one state in which the first and second frames are fitted to each other, such as a closed state in the case of an openable system. In this case, it is possible that the first frame forms a sash portion of a window, and the second frame forms a window frame. The lighting device 200 including a sash portion and a window frame of a window may be referred to as a window system 200 or a building product 200 for a window.

Figure 16:
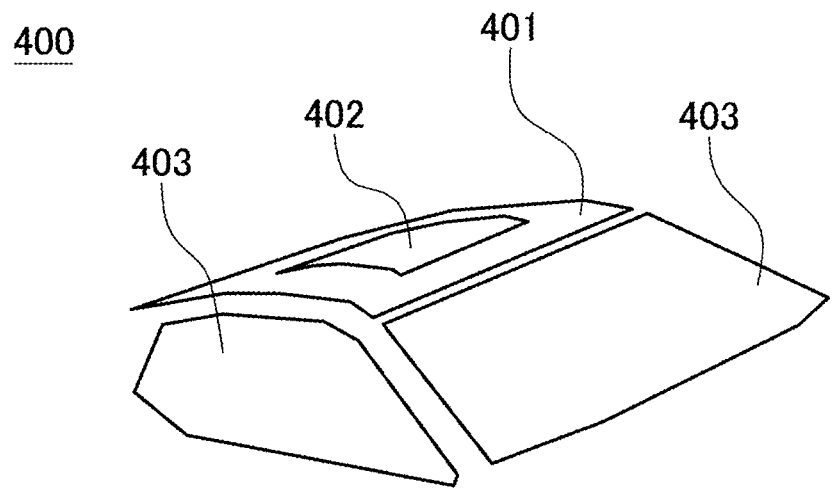
FIG. 16 is a schematic configuration diagram illustrating an application example of the lighting device according to the first embodiment.

FIG. 16 is a diagram illustrating an application example of the lighting device 200. As illustrated in FIG. 16, the lighting device 200 may be used as a sunroof 402 or a window 403 of a building (not illustrated) or a mobile body 400. In this case, the frame 300 may be fixed to a body 401 of the mobile body 400, such as a vehicle, or may be formed integrally with the body 401, and the window regions 301 of the diffuser 20 of the lighting device 200 may function as a window of the mobile body 400, e.g., the sunroof 402 or window 403.

When the lighting device 200 is used as a sunroof or window of a mobile body, the diffuser 20 may have a heat insulation property. The heat insulation property may be provided by applying a heat insulation coating to at least one of the first surface (surface f22) and second surface (surface f23) of the diffuser 20, or by adding an additive into the diffuser 20.

Figure 17:
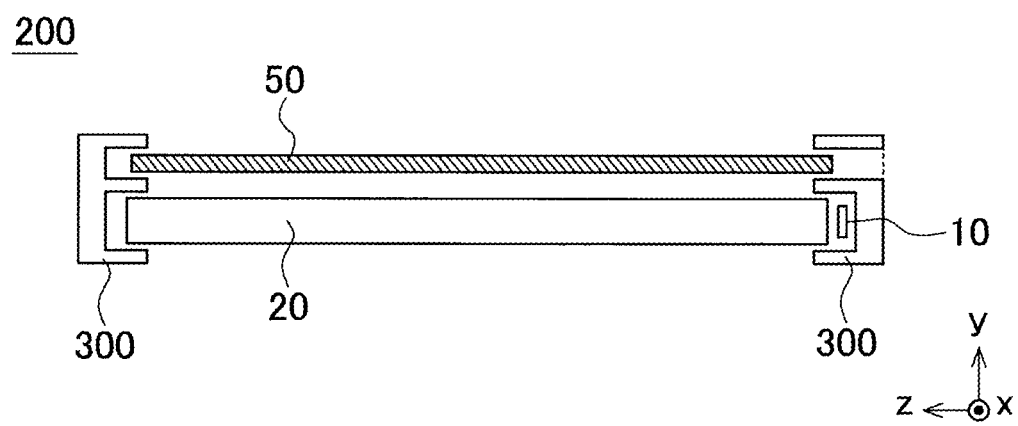
FIG. 17 is a schematic configuration diagram illustrating another example of the lighting device according to the first embodiment.

FIG. 17 is a schematic configuration diagram illustrating another example of the lighting device 200. For example, as illustrated in FIG. 17, the lighting device 200 may include a light shield plate 50, such as a sliding shutter that covers the opening 33 on the first surface side or second surface side of the diffuser 20, that physically blocks light. The light shield plate 50 is an example of a light shield. This improves the heat insulation of a room interior or a vehicle interior. In addition, a heat insulation coating may be applied to the light shield plate 50.

In the example illustrated in FIG. 17, the light shield plate 50 is movable in the −z axis direction. Also, FIG. 17 illustrates an example in which the light shield plate 50 is provided on the second surface side of the diffuser 20. However, the light shield plate 50 may be provided on the first surface side. Light shield plates 50 may be provided on both the first surface side and second surface side. When a light shield plate 50 is provided on the first surface side, the light shield plate 50 is placed in an open state when the light sources 10 are turned on.

For example, when the lighting device 200 is used as a window of a vehicle interior, it is possible to provide a light shield plate 50 between the diffuser 20 and the outside and another shield plate 50 between the diffuser 20 and the vehicle interior, thereby further improving the heat insulation of the vehicle interior.

Figure 18:
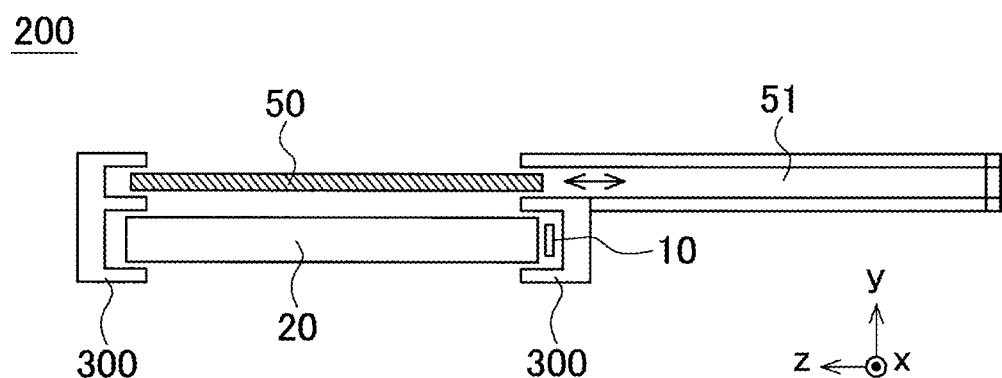
FIG. 18 is a schematic configuration diagram illustrating another example of the lighting device according to the first embodiment.

Also, as illustrated in FIG. 18, when the lighting device 200 includes the light shield plate 50, the frame 300 may include a door pocket 51 that can accommodate the light shield plate 50 in an open state.

The light shield plate 50 not only may be one that always blocks light, but also may be a variable transmittance filter capable of controlling the amount of transmitted light under external control. Examples thereof include a combination of two polarizing plates, and an optical shutter using, for example, a liquid crystal material whose transmittance changes in accordance with an applied voltage or the like. In this case, external light may be blocked as needed by rotating one of the polarizing plates or by controlling a voltage applied to the liquid crystal material.

Figure 19:
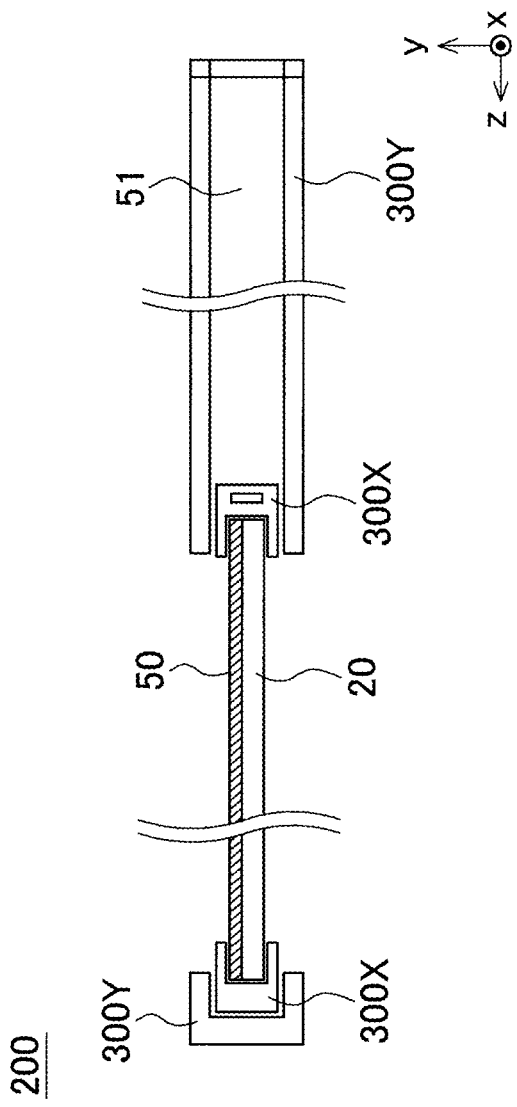
FIG. 19 is a schematic configuration diagram illustrating another example of the lighting device according to the first embodiment.

Also, in the lighting device 200, the light shield plate 50 and diffuser 20 may be integrally supported, or integrally formed into a laminated structure. In this case, when the weather has a small effect on the environment in the vehicle, such as when the amount of sunlight is comfortable in fair weather, the frame 300 may accommodate the light shield plate 50 and diffuser 20 in the door pocket 51, physically uncover the window regions 301, and allow the outside, a sunroof glass provided separately, or the like to be seen. Also, when the weather has a large effect on the environment in the vehicle, such as when the sunlight is too strong, or when the weather is bad, such as when the weather is rainy or cloudy, the frame 300 may draw the light shield plate 50 and diffuser 20 out of the door pocket to place the window regions 301 in a closed state. For example, as illustrated in FIG. 19, the frame 300 may include a door pocket 51 capable of accommodating the light shield plate 50 and diffuser 20. Although FIGS. 17 to 19 each illustrate an example in which the light shield plate 50 and diffuser 20 move in the z axis direction, the moving direction is not limited to the z axis direction, and may be, for example, the z axis direction.

Moreover, regardless of whether the light shield plate 50 is present, the lighting device 200 may be capable of accommodating the diffuser 20 in the door pocket 51 and physically uncovering the window regions 301. For example, the lighting device 200 may be used as an openable sunroof provided in a mobile body. In this case, in an open state of the sunroof, the diffuser 20 is accommodated in a door pocket 51 provided in the frame 300. Also, the sunroof is placed in a closed state by drawing the diffuser 20 accommodated in the door pocket 51 out of the door pocket 51.

Figure 20A:
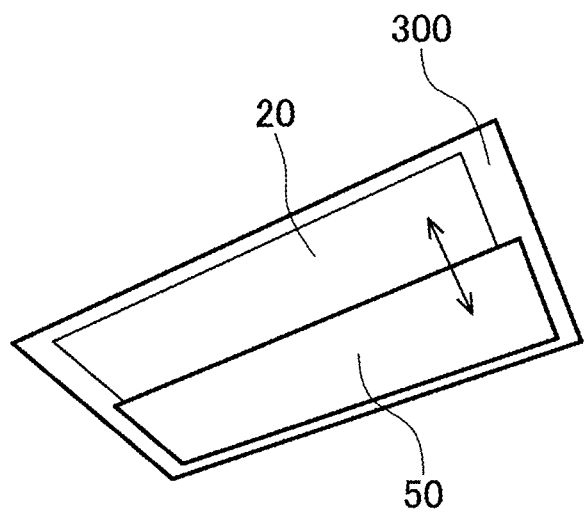
FIGS. 20A and 20B are schematic diagrams each illustrating an example of a configuration in which the lighting device is applied to a sunroof.
Figure 20B:
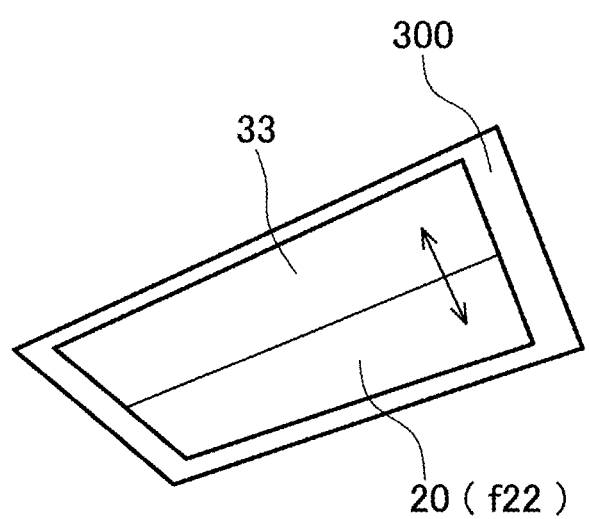

FIGS. 20A, 20B, and 21A to 21D are diagrams each illustrating an example of a configuration in which the lighting device is applied to a sunroof. FIGS. 20A and 20B illustrate examples of the lighting device 200 when the lighting device 200 is viewed from the front surface side (−y axis direction). As illustrated in FIG. 20A, a light shield plate 50 as a light shield may be provided on the front surface side of the diffuser 20 in such a manner as to be openable and closable with respect to at least the window regions 301. Also, as illustrated in FIG. 20B, the diffuser 20 may be provided so that the diffuser 20 itself is openable and closable with respect to the openings 33 provided in the frame 300. In this example, the openings 33 correspond to the window regions 301 when the diffuser 20 is in a closed state.

Figure 21A:
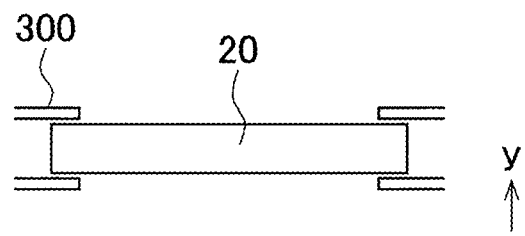
FIGS. 21A to 21D are cross-sectional views each illustrating an example of a configuration in which the lighting device is applied to a sunroof.
Figure 21B:
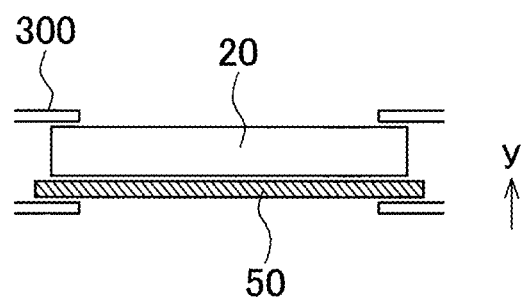
Figure 21C:
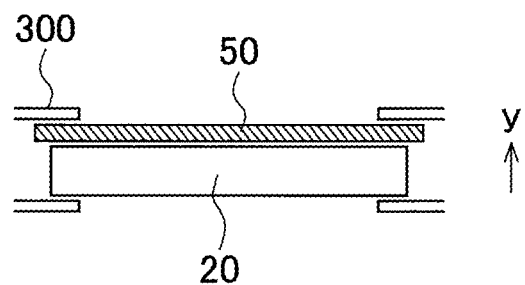
Figure 21D:
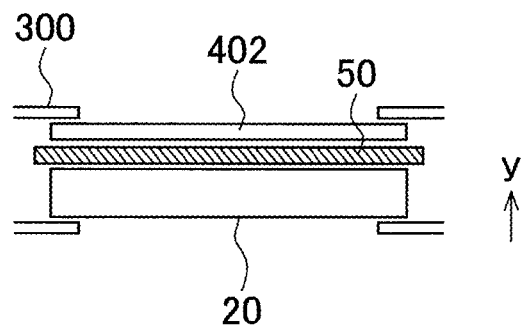

Also, FIGS. 21A to 21D are cross-sectional views each illustrating a schematic configuration example of the lighting device 200 when it is applied to a sunroof. In the examples illustrated in FIG. 21, the light sources 10 are not illustrated in order to avoid limiting a moving direction. The example illustrated in FIG. 21A is an example in which the frame 300 supports only the diffuser 20 in the window regions 301. The diffuser 20 may be fixed to the frame 300 or supported by the frame 300 to be openable and closable. Also, the example illustrated in FIG. 21B is an example in which the frame 300 supports the diffuser 20 and the light shield plate 50 on the front surface side thereof, in the window regions 301. The diffuser 20 may be fixed to the frame 300 or supported by the frame 300 to be openable and closable. Also, the light shield plate 50 is supported so that it can be opened and closed independently of the diffuser 20. Also, the example illustrated in FIG. 21C is an example in which the frame 300 supports the diffuser 20 and the light shield plate 50 on the back surface side thereof, in the window regions 301. The diffuser 20 may be fixed to the frame 300 or supported by the frame 300 to be openable and closable. Also, the light shield plate 50 may be supported so that it can be opened and closed in conjunction with the diffuser 20 or independently of the diffuser 20. Also, the example illustrated in FIG. 21D is an example in which the frame 300 supports the diffuser 20, the light shield plate 50 on the back surface side thereof, and a sunroof glass 402 on the back surface side thereof, in the window regions 301. The sunroof glass 402 may be fixed to the frame 300 or supported by the frame 300 to be openable and closable. Also, the diffuser 20 and light shield plate 50 are supported so that they can be opened and closed independently of or in conjunction with each other. Also in each example illustrated in FIG. 21, the frame 300 not only may be fitted in an opening of a body 401 of the vehicle, but also may be formed integrally with the body 401.

The frame 300 and frame portion 31 need not surround all of the at least one edge surface (side surface f21) of the diffuser 20. For example, the frame 300 and frame portion 31 may have a configuration that exposes a part (e.g., one side) of the edge portions of the first and second surfaces of the diffuser 20 and an edge surface connected to the part, such as a configuration in which the front shape is equal sign-shaped, U-shaped, or C-shaped. Thereby, when the diffuser 20 itself is slidable, such as when the lighting device 200 is used as an openable sunroof, it is possible to make the boundary between an opening region opened by the sliding and the diffuser 20 less visible to a user.

The frame 300 and frame portion 31 may be provided, for example, at only edge portions corresponding to corners of the diffuser 20, at only edge portions corresponding to opposite two sides, at only edge portions corresponding to opposite two sides and a side connecting ends of the two sides, or at only a part of the edge portion and another part of the edge portion opposite the part in the top view.

Also, the frame 300 may include therein a power source that supplies electrical power to the light sources 10. Also, the frame 300 may include a power receiving module to allow non-contact electrical power feeding between the frame 300 and the installation body 40. For example, the installation body 40 may include a power transmitting module, and the joint 38 may include the power receiving module. It is possible that, instead of the installation body 40, the first frame corresponding to a window frame or the like includes a power transmitting module, and the second frame corresponding to a sash portion that makes contact with the first frame includes a power receiving module.

Moreover, it is possible that the frame 300 can be charged by contact between the frame 300 and the installation body 40 or contact between separate frames. For example, when the lighting device 200 is installed as an openable window or door, the lighting device 200 may include, in the joint 38 of the frame 300 or the like, a power receiver and a power storage so that the lighting device 200 can be charged when the window or door is in a closed state. For example, the power receiver receives electrical power by contact with a power feeder provided, for example, in an inner wall of a window frame or an inner wall of a door frame of the door. The power storage stores electrical power received by the power receiver. When the power reception is always possible, e.g., in the case of a fix window that is not openable, the power storage may be omitted.

Also, the lighting device 200 may include a solar power generation module, such as a solar power generation panel, on a surface of the frame 300 on the back surface side to allow external light to provide electrical power to the light sources 10.

<Advantages of Lighting Device 200>
<<Rayleigh Scattering>>

Figure 22:
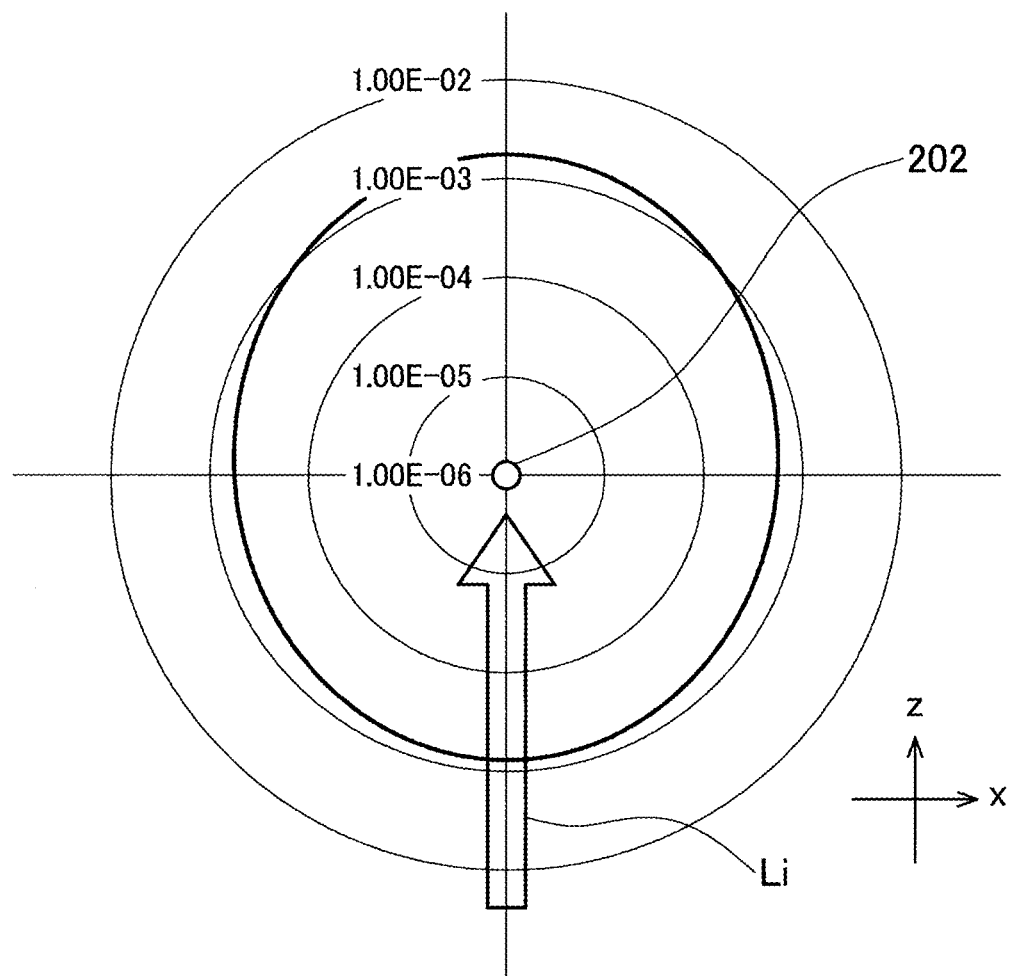
FIG. 22 is a diagram illustrating an example of a scattered light intensity angular distribution due to Rayleigh scattering by a single particle according to the first embodiment.

Rayleigh scattering, which is a light scattering phenomenon, will be described below with reference to FIG. 22. FIG. 22 is a diagram illustrating an example of a scattered light intensity angular distribution due to Rayleigh scattering by a single particle 202 according to the first embodiment.

Light striking the particle 202 is described to be, for example, light Li emitted from the light sources. The light striking the particle 202 may be light Lt guided in the diffuser 20. The vertical axis Z is an axis parallel to a traveling direction of the light Li. The light Li travels in the +Z axis direction. The horizontal axis X is an axis perpendicular to the vertical axis Z.

In a case where the particle diameter of a particle is smaller than the wavelengths of visible light, when a light beam strikes the particle, Rayleigh scattering occurs. The wavelengths of visible light range, for example, from 380 nm to 780 nm. Specifically, Rayleigh scattering occurs when a size parameter a given by the particle diameter d of the particle and the wavelength λ of the light satisfies the following formula (1), where "·" denotes multiplication:

$$\alpha \ll n \cdot d / \lambda. \quad (1)$$

In Rayleigh scattering, the scattering cross-section σ is a parameter that indicates the probability of scattering, and has the relationship of the following formula (2) with the particle diameter d and the wavelength λ of the light:

$$\sigma \propto d^6 / \lambda^4. \quad (2)$$

Formula (2) shows that the scattering cross-section σ in Rayleigh scattering is inversely proportional to the fourth power of the wavelength λ of the light. Thus, in Rayleigh scattering, light of a shorter wavelength is more likely to be scattered. For example, when light beams are incident on particles having the same particle diameter d and refractive index n, blue light is more likely to be scattered than red light. The wavelength λ of the blue light is, for example, 450 nm. The wavelength λ of the red light is, for example, 650 nm.

FIG. 22 illustrates an unpolarized scattered light intensity distribution. The particle diameter d of the particle is 100 nm. The particle refractive index n is 1.43. The refractive index of the base material is 1.33. The wavelength of the light is 450 nm.

As illustrated in FIG. 22, in Rayleigh scattering, the scattered light is emitted in all directions. Thus, even when light is caused to enter through the side surface f21 of the diffuser 20, it is possible to extract light through the front surface f22 and back surface f23 perpendicular to the side surface f21.

<<Occurrence of Scattered Light Simulating Sky>>

The principle of occurrence of scattered light simulating the sky (in particular the blue sky) will be described below with reference to FIG. 6. As illustrated in FIG. 6, light Li emitted from the light sources 10 enters through the side surface f21 of the diffuser 20. The light Li entering through the side surface f21 is guided as light Lt in the diffuser 20. The entering light Lt is reflected by the front surface f22 and back surface f23.

In transmitting in the diffuser 20, part of the light Lt strikes the particles 202. The light Lt striking the particles 202 is scattered in all directions.

Of the scattered light, light incident on the front surface f22 at an incident angle not greater than the critical angle is emitted as light Ls through the front surface f22. The critical angle refers to the smallest incident angle that yields total reflection when light travels from a part having a higher refractive index to a part having a lower refractive index.

Of the scattered light, light incident on the back surface f23 at an incident angle not greater than the critical angle is emitted as light Ls through the back surface f23.

At this time, from formula (2), in Rayleigh scattering, light of a shorter wavelength is more likely to be scattered. Thus, the correlated color temperature Tcs of the scattered light is higher than the correlated color temperature Tci of the incident light. For example, the correlated color temperature Tci is the correlated color temperature of the light Li emitted by the light sources 10. For example, the correlated color temperature Tcs is the correlated color temperature of the scattered light Ls.

When the light Li has a spectral distribution over the entire visible light range, blue light is preferentially scattered. The light Li is, for example, white light. The light sources 10 include, for example, white LEDs. Thus, by appropriately designing the light sources 10 and diffuser 20, the light Ls is made to have a correlated color temperature representing a blue close to the color of the actual sky.

Since the amount of the scattered light Ls depends on the amount of the incident light Li, by appropriately setting the amount of light of the used light sources, it is possible to reproduce the sky color while providing sufficient brightness as a lighting device. Also, since the optical path length of the incident light in the diffuser 20 is independent of the thickness direction, it is possible to reduce the thickness (the length in the main emission direction) of the diffuser 20. For example, with the configuration of this embodiment, the thickness of the diffuser 20 can be set to 100 mm or less. Also, for example, the thickness of the diffuser 20 may be 20 mm or less, and can be 10 mm or less. Moreover, for example, the thickness of the diffuser 20 can be 5 mm or less.

<<Window Function of Lighting Device 200>>

In the lighting device 200, the light sources 10 are disposed at the side surface f21 of the diffuser 20, and light Li emitted from the light sources 10 is guided in the diffuser 20 and strikes the particles 202 dispersed in the diffuser 20, thereby being Rayleigh scattered and emitted from the diffuser 20. To provide a thin lighting device that simulates the sky, it is advantageous to cause light to enter through an edge portion of the diffuser 20 that causes Rayleigh scattering. However, in such a configuration, while the light is guided, light having a higher correlated color temperature is more preferentially scattered. Thus, as the light guiding distance increases, the correlated color temperature of the scattered light decreases. This is because the number of times light is scattered by the nanoparticles increases as the light guiding distance increases. Thus, as the light is guided, the color of the scattered light changes from blue to red. This may cause color unevenness on the emission surface of the diffuser 20.

To reproduce the sky, in use for lighting, of the light incident from the light sources 10, light of blue wavelengths needs to be scattered at an appropriate ratio relative to light of the other wavelengths. On the other hand, to prevent brightness unevenness or color unevenness due to the scattered light Ls from occurring in the front surface f22 or back surface f23 of the diffuser 20, the addition concentration of the particles 202 dispersed in the diffuser 20 needs to be low. Also, in a case where it is intended to use the lighting device 200 as a window for viewing the opposite space, when the light sources are turned off, it is preferable that ambient light incident from the back surface side be not colored due to Rayleigh scattering. This does not apply to the case of using it as a window for daylighting.

In the lighting device 200 of this embodiment, attention is paid to a haze value of the diffuser 20.

In a method of throwing light of a light source from the back surface side of a diffuser 20 as in the lighting system described in Patent Literature 1, it is necessary to sufficiently cause scattering while the light is guided for a short distance corresponding to the thickness of the diffuser 20. Thus, when the system in which the light source is disposed at an edge portion of the diffuser 20 as in the present embodiment is compared to the system described in Patent Literature 1, under the condition that the outer shape of the diffuser 20 and the refractive index ratio between the base material and the particles are comparable between the two systems, the system of the present embodiment allows the concentration of the particles added to the diffuser 20 to be reduced, thereby allowing the haze of the diffuser 20 in the thickness direction to be reduced.

The haze value is an index for transparency, and determined from the ratio of diffuse transmitted light to total transmitted light. The haze value in the thickness direction refers to the ratio of the diffuse transmitted light emitted through the front surface f22 (or back surface f23) to the total transmitted light when white light enters through the back surface f23 (or front surface f22) of the diffuser 20.

The haze value of the diffuser 20 in the thickness direction is in the range of 0.005% to 30%, more preferably 0.1% to 15%, and still more preferably 0.5% to 5%. By limiting the haze of the diffuser 20 within this range, it is possible, when the light sources 10 are turned off, to provide sufficient transparency or translucency as a window, and when the light sources 10 are turned on, to sufficiently reproduce the sky color while reducing color unevenness or brightness unevenness as lighting equipment.

As such, the lighting device 200 can provide both a function as a lighting device that simulates the natural sky and a window function.

For example, in fair weather, the lighting device 200 can function as a window that, for example, introduces external light into a room, by placing the light sources 10 in an off state. Also, for example, in rainy or cloudy weather, the lighting device 200 can function as a lighting device that simulates the natural sky, by placing the light sources 10 in an on state. Thus, regardless of the weather, it is possible to provide a sense of openness felt in fair weather to the room interior. At this time, it is possible to use external light incident on the diffuser 20 from the back surface side to supplement the brightness as a lighting function, for example, or to allow sunlight (direct sunlight) to be seen.

Moreover, for example, when the sunlight is strong, by setting a light shielding function (not illustrated), such as an external blind or light shield, on the back surface side of the diffuser 20 and placing the light sources 10 in an on state, it is possible to provide a sense of openness of the natural sky while reducing discomfort due to dazzling sunlight.

Also, with the lighting device 200, it is possible not only to provide a sense of openness of the natural sky regardless of the weather, but also to place the light sources in an off state to allow the opposite space to be seen through the diffuser 20 when a user intends to see the opposite space, by switching between the on state and the off state in accordance with a user operation.

Moreover, when the diffuser 20 itself is slidable, the lighting device 200 can provide both a function as a lighting device that simulates the natural sky and a function of an openable window.

For example, when the lighting device 200 is used as a sunroof or window of a mobile body, in fair weather, by placing the light sources 10 in an off state, it is possible to introduce natural light to a vehicle interior or view the situation outside the vehicle, e.g., the actual sky, and in rainy or cloudy weather, by placing the light sources 10 in an on state, the lighting device 200 functions as a lighting device that simulates the natural sky, and a user of the mobile body can feel a sense of openness of the natural sky regardless of the weather.

Also, in a case where a light shielding function, such as an external shutter or light shield, is provided between the diffuser 20 and the outside to improve heat insulation of a vehicle interior, when it is intended to prevent increase in the temperature of the vehicle interior depending on the weather, for example, on a strong sunlight day, it is possible to place the light shielding function in a closed state (a state in which the window regions are covered) and turn on the light sources 10 to simulate the natural sky, thereby feeling a sense of openness of the natural sky while preventing increase in the temperature of the vehicle interior.

Moreover, also in a case where a light shielding function, such as an external shutter or light shield, is provided between the diffuser 20 and a vehicle interior of a mobile body to improve heat insulation of the vehicle interior, since it is possible to simulate the natural sky by placing the light shielding function in an open state (a state in which the window regions are uncovered) and placing the light sources 10 in an on state as appropriate, a user of the mobile body can feel a sense of openness of the natural sky regardless of the weather.

Moreover, in a case where a light shielding function, such as an external shutter or light shield, is provided between a sunroof glass provided in a mobile body and the diffuser 20 to improve heat insulation of the vehicle interior, when it is intended to prevent increase in the temperature of the vehicle interior depending on the weather, for example, on a strong sunlight day, it is possible to simulate the natural sky by placing the light shielding function and diffuser 20 in a closed state (a state in which the window regions are covered) and turning on the light sources 10. Also, in rainy or cloudy weather, it is possible to simulate the natural sky by placing at least the diffuser 20 in a closed state and turning on the light sources 10. Also, in fair weather, when the sunlight is not strong, it is also possible to enjoy the natural sky through the sunroof glass by placing the light shielding function and diffuser 20 in an open state.

Moreover, in a case where the lighting device 200 is used as an openable sunroof provided in a mobile body, it is possible to simulate the natural sky by placing the diffuser 20 used as a window of the sunroof in a closed state and placing the light sources 10 in an on state, and a user of the mobile body can enjoy a sense of openness of the natural sky regardless of the weather.

<<Circadian Effect Due to Light Source Color Change>>

As already described, the lighting device 200 may include multiple light sources 10 having different emission colors.

For example, the lighting device 200 may control each light source 10 to dynamically change the correlated color temperature (Tci) of light Li. Thereby, it is possible to dynamically change the correlated color temperature (Tcs) of light Ls. Also, for example, the lighting device 200 may control each light source 10 to dynamically change the amount of light Li. Thereby, it is possible to dynamically change the amount of light Ls.

By changing the correlated color temperature and amount of light Li, which is light incident on the diffuser 20, in this manner, it is possible to make an observer seeing light Ls feel as if the color of the sky changes with time. This makes it possible to generate a circadian rhythm.

"Circadian rhythm" refers to a physiological phenomenon that varies with a period of about 24 hours. Most living organisms, such as animals and plants, have circadian rhythms. It is also referred to generally as "biological clock". In a strict sense, the circadian rhythm is internally generated. However, it is modified by external stimulations, such as light, temperature, or eating.

As described above, when the light sources 10 are turned off, the lighting device 200 has a translucency or a visibility of the opposite space such that the lighting device 200 can be used as a window, and when the light sources 10 are turned off, the lighting device 200 can reproduce the sky color while providing sufficient brightness as lighting equipment. Thereby, it is possible to provide the lighting device 200 that functions as a window when the light sources 10 are turned off, and functions as lighting equipment that simulates the natural sky when the light sources 10 are turned on.

<First Modification>

A first modification of the lighting device according to the first embodiment will be described below. Hereinafter, elements that are the same as those of the lighting device 200 are given the same reference characters, and description thereof will be omitted.

Figure 23:
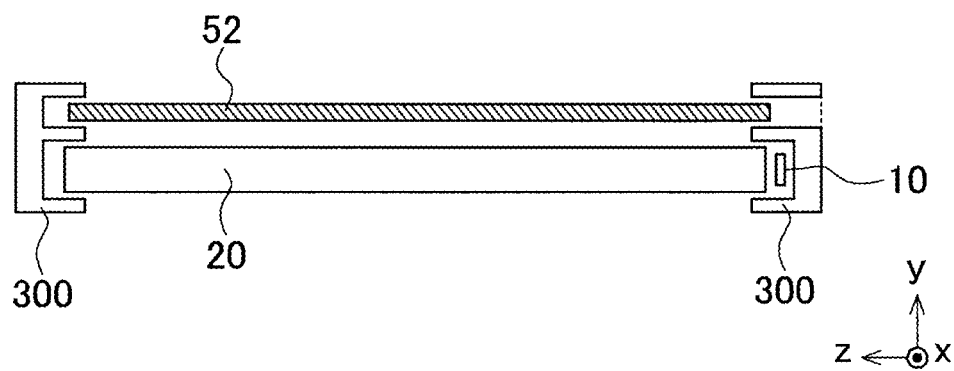
FIG. 23 is a cross-sectional view illustrating an example of a configuration of a lighting device according to a first modification.

FIG. 23 is a cross-sectional view illustrating an example of a configuration of a lighting device 210 according to the first modification. The lighting device 210 includes a back plate 52 in addition to one or more light sources 10, a diffuser 20, and a frame 300.

The back plate 52 is provided on the back surface side of the diffuser 20. The back plate 52 may be provided to face the back surface f23 of the diffuser 20. Although another functional plate may be provided between the back plate 52 and the diffuser 20, the plate is assumed to be openable and closable. The distance between the back plate 52 and the diffuser 20 is preferably small. The back plate 52 may be provided as a modification of the above-described light shield plate 50, or may be provided separately from the light shield plate 50.

The back plate 52 is opaque, and its transmittance is preferably 50% or less, and more preferably 10% or less.

The back plate 52 is preferably a diffuse reflector, and more preferably a white diffuse reflector. The back plate 52 may be a light absorber.

The opening/closing state of the back plate 52 can be changed. The back plate 52 may be configured so that the opening/closing state can be changed in accordance with the state of folding of the back plate 52 or the state of accommodation of the back plate 52 into a door pocket, like, e.g., a blind or a shutter. Also, the back plate 52 may be configured so that the opening/closing state can be changed in accordance with the state of accommodation of the back plate 52 into a door pocket provided in the opening in which the lighting device 210 is installed, like, e.g., a rain shutter.

It is possible that the shielding state of the back plate 52 can be changed in accordance with a voltage applied to the back plate 52, like, e.g., a liquid crystal shutter. It is possible that the shielding state of the back plate 52 can be changed in accordance with a voltage applied to the back plate 52, like, e.g., a liquid crystal panel.

It is possible that the frame 300 includes therein a space for accommodating the back plate 52, the back plate 52 is accommodated in the frame 300 in a closed state, and the back plate 52 is exposed outside the frame in an open state. Moreover, a shutter provided to an opening in which the lighting device 210 is installed may be substituted for the back plate 52. For example, when it is used in a sunroof of a mobile body, a shutter provided in a vehicle body may be substituted for the back plate 52.

The back plate 52 may be supported integrally with the diffuser 20 in the frame 300. That is, it may be supported so that it can be opened and closed integrally with the diffuser 20.

<<Advantages of Back Plate 52>>

When the light sources 10 are turned on, the scattered light Ls is emitted through not only the front surface f22 but also the back surface f23 of the diffuser 20. For example, when it is assumed that the lighting device 210 is disposed in a wall separating spaces and the front surface f22 faces one (referred to below as the inside) of the spaces in which an observer is present, the scattered light Ls emitted through the back surface f23 to the other (referred to below as the outside) of the spaces on the back surface f23 side is not seen by the observer, resulting in loss. Also, the emission of the scattered light Ls to the outside may cause light pollution for a person other than the observer located in the outside.

By providing the back plate 52 on the back surface f23 side of the diffuser 20, when the light sources 10 are turned on, it is possible to prevent the scattered light Ls emitted through the back surface f23 of the diffuser 20 from being emitted to the outside. Moreover, by using, as the back plate 52, a member, such as a diffuse reflector, that reflects the scattered light Ls emitted through the back surface f23, it is possible to cause the scattered light Ls emitted through the back surface f23 to be emitted through the front surface f22, thereby improving the light use efficiency as lighting equipment of the lighting device 210.

Thus, by providing the back plate 52 whose opening/closing state can be changed on the back surface side of the diffuser 20, it is possible to provide the lighting device 210 that has the same function as the lighting device 200 when the back plate 52 is in an open state, and that reduces light pollution and has improved light use efficiency when the back plate 52 is in a closed state.

<Second Modification>

A second modification of the lighting device according to the first embodiment will be described below. Hereinafter, elements that are the same as those of the lighting devices 200 and 210 are given the same reference characters, and description thereof will be omitted.

Figure 24:
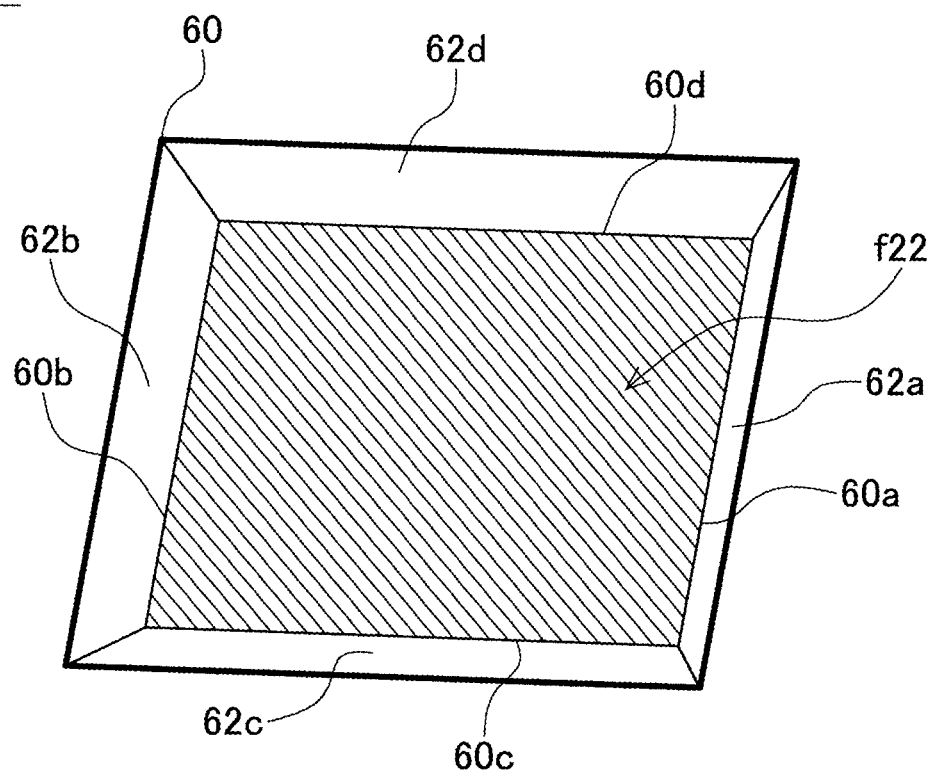
FIG. 24 is a perspective view illustrating an example of a configuration of a lighting device according to a second modification.
Figure 25:
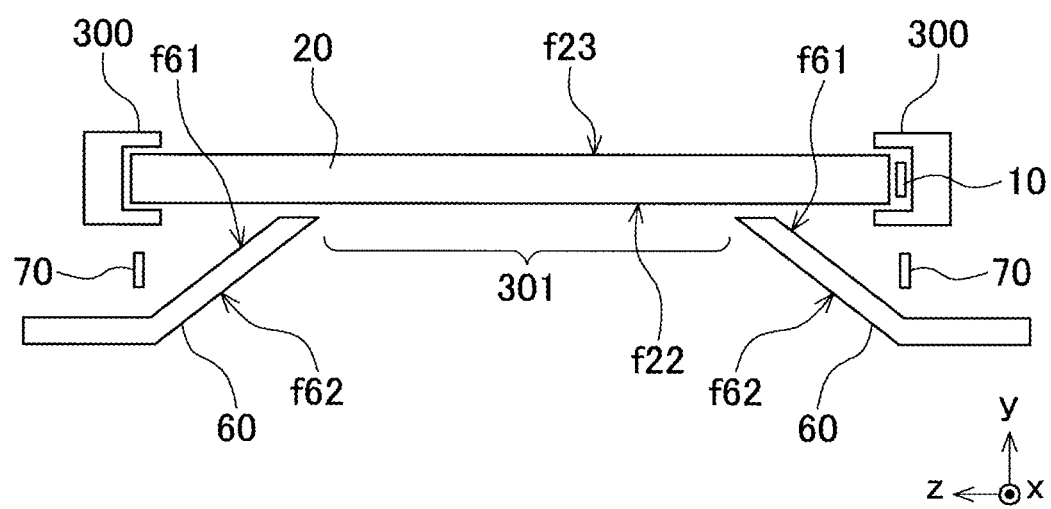
FIG. 25 is a cross-sectional view illustrating the example of the configuration of the lighting device according to the second modification.

FIGS. 24 and 25 are explanatory diagrams illustrating an example of a configuration of a lighting device 220 according to the second modification. FIG. 24 is a perspective view of the lighting device 220, and FIG. 25 is a cross-sectional view of the lighting device 220.

The lighting device 220 includes a sunlight reproducer 60 and one or more auxiliary light sources 70, in addition to one or more light sources 10, a diffuser 20, and a frame 300. Hereinafter, the light sources 10 may be referred to as the first light sources, and the auxiliary light sources 70 may be referred to as the second light sources.

The sunlight reproducer 60 is provided on the front surface f22 side of the diffuser 20. The sunlight reproducer 60 includes an incident surface f61 and an emission surface f62. The incident surface f61 is, for example, a surface on an anti-viewing side of the sunlight reproducer 60. The emission surface f62 is, for example, a surface on a viewing side of the sunlight reproducer 60. Here, the viewing side is a side that is seen by a user located on the main light emitting surface side of the diffuser 20 in a state in which the lighting device 220 is installed, and the anti-viewing side is the opposite side.

For example, for convenience, the sunlight reproducer 60 may be divided into multiple areas (in this example, sunlight reproducers 60a, 60b, 60c, and 60d corresponding to the respective sides of the rectangular window region 301, or the like). The division of the sunlight reproducer 60 is not limited to the above example.

When, for example, for convenience, the sunlight reproducer 60 is divided into multiple areas, the incident surface f61 and emission surface f62 may also be divided into multiple areas in accordance with the sunlight reproducer 60 after the division.

In the example illustrated in FIG. 25, the sunlight reproducer 60 is divided into four, which are referred to as sunlight reproducers 60a, 60b, 60c, and 60d. In this case, the incident surface f61 and emission surface f62 may also be each divided into four. Hereinafter, an incident surface of the sunlight reproducer 60a will be referred to as f61a, and an emission surface of the sunlight reproducer 60a will be referred to as f62a. Likewise, an incident surface of the sunlight reproducer 60b will be referred to as f61b, and an emission surface of the sunlight reproducer 60b will be referred to as f62b; an incident surface of the sunlight reproducer 60c will be referred to as f61c, and an emission surface of the sunlight reproducer 60c will be referred to as f62c; an incident surface of the sunlight reproducer 60d will be referred to as f61d, and an emission surface of the sunlight reproducer 60d will be referred to as f62d.

The auxiliary light sources 70 are provided on a back side (an anti-viewing side as viewed from a user) of the sunlight reproducer 60. Thus, the sunlight reproducer 60 is provided with the auxiliary light sources 70, on the incident surface f61 side. For example, the auxiliary light sources 70 may be provided between the sunlight reproducer 60 and the diffuser 20.

When the sunlight reproducer 60 is divided into multiple areas for convenience, the sunlight reproducer 60 is provided with the auxiliary light sources 70, on the incident surface f61 side of at least one of the areas.

The auxiliary light sources 70 are, for example, LED light sources. Although the illustration is omitted, the auxiliary light sources 70 may include substrates 72 and LED elements 73, as with the light sources 10. Also, multiple auxiliary light sources 70 may be provided. In this case, the auxiliary light sources 70 may be arranged, for example, on a substrate 72, as with the light sources 10. In this case, it can be considered that multiple auxiliary light sources 70 are provided.

For example, when the sunlight reproducer 60 is divided into multiple areas, at least one auxiliary light source 70 may be provided to each area. Also, for example, two or more auxiliary light sources 70 may be provided to each area. As an example, when the sunlight reproducer 60 is provided to define the window region 301 in a polygonal shape, multiple auxiliary light sources 70 may be provided along each side of the window region 301.

The correlated color temperatures of lights emitted by the respective light sources may be the same or different.

Also, the color of light emitted from the auxiliary light sources 70 may be a color other than white. When multiple auxiliary light sources 70 are provided, the auxiliary light sources 70 may include, for example, a white LED light source and an orange LED light source. Also, the auxiliary light sources 70 may include, for example, a white LED light source having a low color temperature and a white LED light source having a high color temperature.

The sunlight reproducer 60 is formed by, for example, a light diffuser. The light diffuser may be one obtained by dispersing fine particles in a transparent member, or one obtained by performing surface treatment, such as emboss processing, on a surface of a transparent member.

The sunlight reproducer 60 may be formed by, for example, a transparent member and a light diffuser. In this case, the light diffuser may be provided on an incident surface side of the transparent member, an emission surface side of the transparent member, or both the sides. The light diffuser may be, for example, a thin-film coating constituted by a transparent material and fine particles, or a diffusing sheet constituted by a transparent material and fine particles. The sunlight reproducer 60 may be formed by applying or stacking such a light diffuser to or on a surface of the transparent member.

Light emitted from the auxiliary light sources 70 enters the sunlight reproducer 60 through the incident surface f61 provided in the sunlight reproducer 60, and is emitted as diffused light through the emission surface f62. Thereby, it is possible to cause the emission surface f62 of the sunlight reproducer 60 to emit light.

The sunlight reproducer 60 may have the entire emission surface f62 emit light, or have only part of the emission surface f62 emit light. When the sunlight reproducer 60 is divided into multiple areas, it may emit light by area. For example, the sunlight reproducer 60 may have all the areas emit light, or have a subset of the areas in a non-light emitting state. For example, the sunlight reproducer 60 may be caused to have part of the sunlight reproducer 60 in a non-light emitting state, by controlling turning on of multiple light sources provided as the auxiliary light sources 70. Also, the sunlight reproducer 60 may have only part of one of the areas emit light.

The lighting device 220 may further include a light shield plate 50 or a back plate 52, as with the lighting device 200 or 210.

Figure 26:
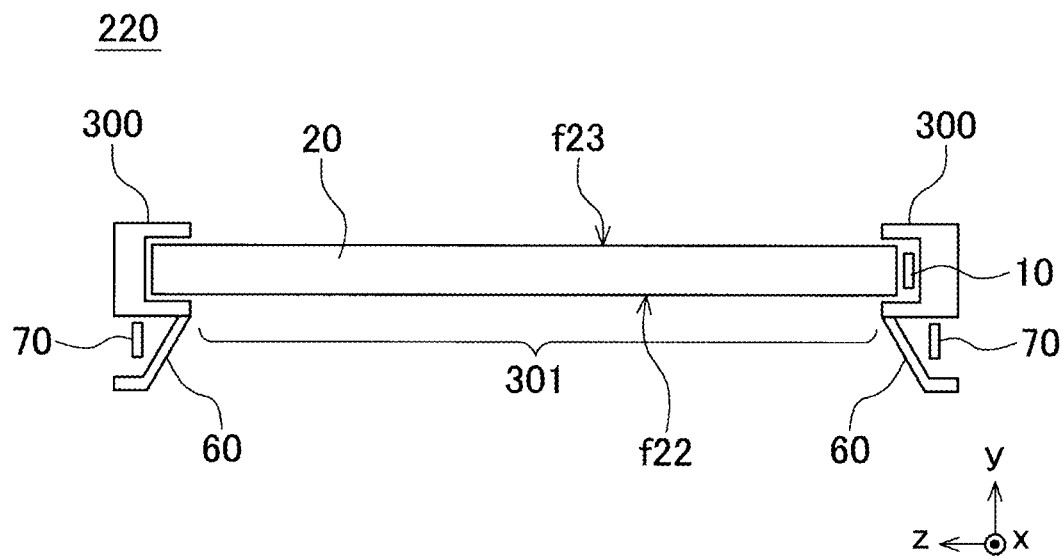
FIG. 26 is a cross-sectional view illustrating an example of the configuration of the lighting device according to the second modification.

Also, the sunlight reproducer 60 may be formed integrally with the frame 300 as illustrated in FIG. 26. FIG. 26 is a cross-sectional view illustrating another example of the configuration of the lighting device 220 according to the second modification.

<<Advantages of Sunlight Reproducer 60>>

Providing the sunlight reproducer 60 capable of emitting light on an emission side of the main light emitting surface of the diffuser 20 makes an observer feel as if the sun were present on the back surface side of the diffuser 20 and a window frame were illuminated by sunlight. This improves the naturalness felt by an observer when the lighting device 220 functions as lighting equipment, and improves a sense of openness in a space. Also, placing portions not to be illuminated by sunlight in a non-light emitting state like an actual window further improves the naturalness felt by an observer when the lighting device 220 functions as lighting equipment.

<Third Modification>

A third modification of the lighting device according to the first embodiment will be described below. Hereinafter, elements that are the same as those of the lighting devices 200, 210, and 220 are given the same reference characters, and description thereof will be omitted.

Figure 27:
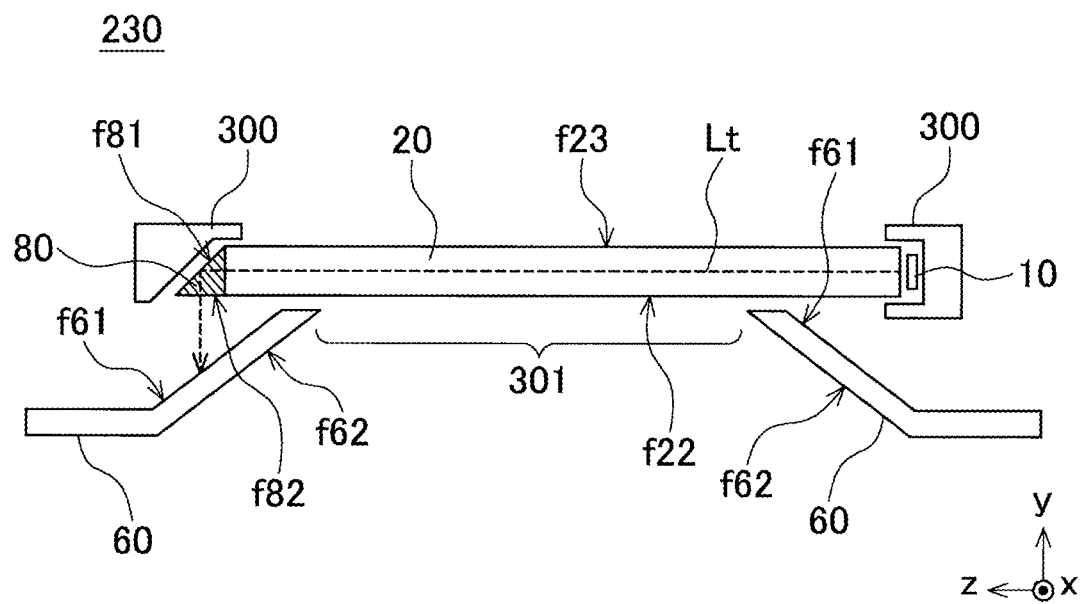
FIG. 27 is a cross-sectional view illustrating an example of a configuration of a lighting device according to a third modification.
Figure 28:
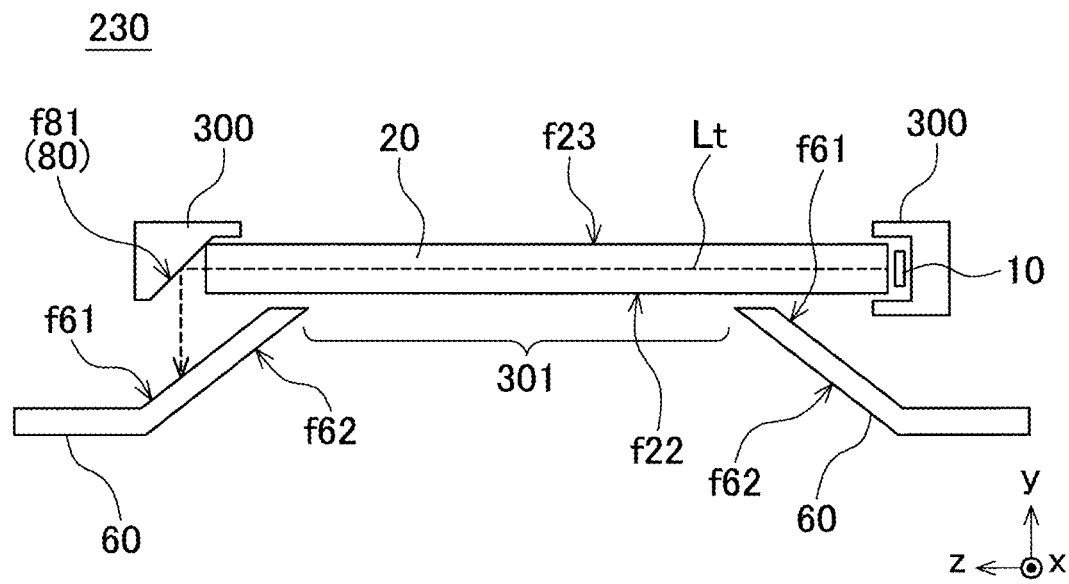
FIG. 28 is a cross-sectional view illustrating an example of the configuration of the lighting device according to the third modification.
Figure 29:
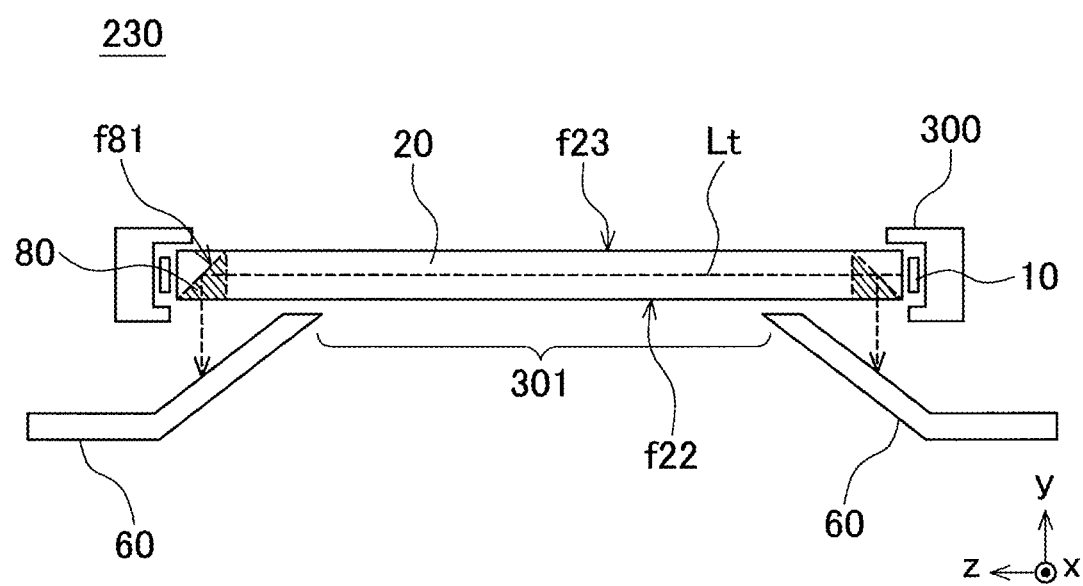
FIG. 29 is a cross-sectional view illustrating an example of the configuration of the lighting device according to the third modification.
Figure 30:
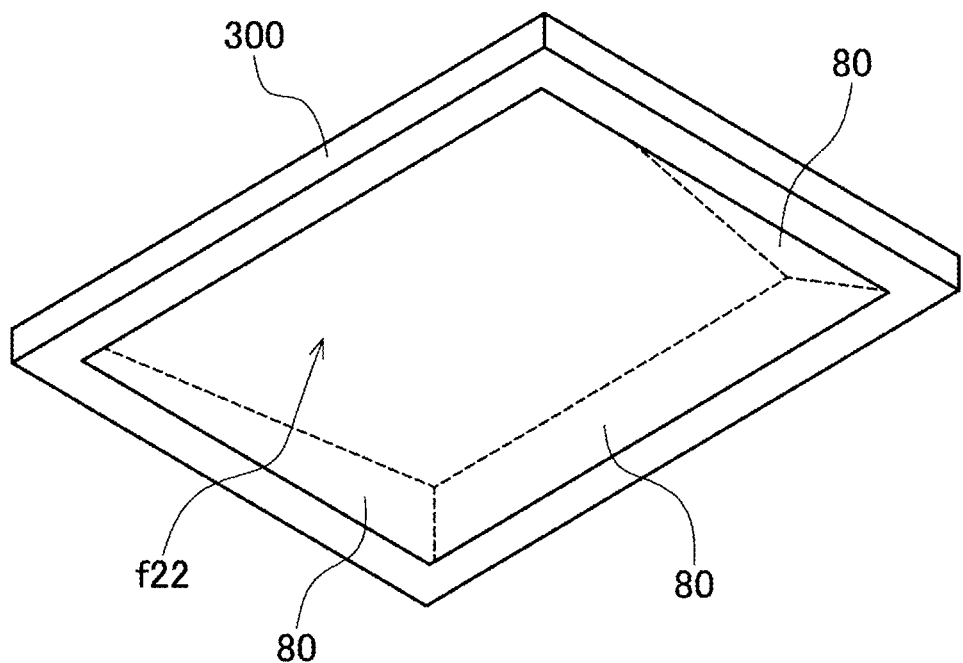
FIG. 30 is a perspective view illustrating an example of the configuration of the lighting device according to the third modification.

FIGS. 27 to 30 are explanatory diagrams each illustrating an example of a configuration of a lighting device 230 according to the third modification. FIGS. 27 to 29 are cross-sectional views each illustrating an example of the lighting device 230, and FIG. 30 is a perspective view illustrating an example of the lighting device 230.

The lighting device 230 includes at least one light folding portion 80 in addition to one or more light sources 10, a diffuser 20, a frame 300, and a sunlight reproducer 60.

The light folding portion 80 is provided at the side surface f21 of the diffuser 20. The light folding portion 80 is provided at the at least one side surface f21 provided in the diffuser 20. The light folding portion 80 emits light guided in the diffuser 20 and reaching the light folding portion 80, toward the sunlight reproducer 60. The light folding portion 80 changes the traveling direction. The light folding portion 80 is an example of a deflector 80.

The light folding portion 80 may include a reflecting surface f81. In this case, the light folding portion 80 reflects light reaching the light folding portion 80, at the reflecting surface f81 toward the sunlight reproducer 60. The light folding portion 80 should have a traveling direction changing function such that it can emit light reaching an edge portion (second edge portion) opposite a first edge portion of the diffuser 20 at which the incident surface is formed, toward the sunlight reproducer 60, and the specific configuration thereof is not limited to the example illustrated in FIG. 27.

The light deflected by the light folding portion 80 illuminates the incident surface f61 of the sunlight reproducer 60. The light enters the sunlight reproducer 60 through the incident surface f61 and exits through the emission surface f62, making diffused light simulating the sunlight.

The reflecting surface f81 is, for example, a mirror surface. The reflecting surface f81 is, for example, a diffuse reflecting surface. The reflecting surface f81 is provided by, for example, metal deposition. The reflecting surface f81 is provided by, for example, white coating.

The light folding portion 80 may be formed by, for example, cutting off part of the side surface f21 of the diffuser 20. At this time, the cut surface is the reflecting surface f81. An edge portion of the diffuser 20 including the cut surface is taken as the light folding portion 80. As such, the diffuser 20 may include the light folding portion 80.

The light folding portion 80 may be integrated with or separate from the diffuser 20.

Also, for example, as illustrated in FIG. 28, the light folding portion 80 may be provided in the inner surface f34 of the frame 300.

Also, the lighting device 230 may further include one or more auxiliary light sources 70, on a side on which the incident surface f61 provided in the sunlight reproducer 60 is provided. The auxiliary light sources 70 increase the amount of light emitted from the sunlight reproducer 60.

Also, the lighting device 230 and the other above-described lighting devices may include the light sources 10 at two or more edge surfaces. In this case, the lighting device may include the light sources 10, for example, at opposite edge surfaces. In such a case, for example, as illustrated in FIG. 29, in the lighting device 230, at opposite edge portions of the diffuser 20, incident surfaces of the diffuser 20 and light folding portions 80 (reflecting surfaces f81) may be arranged so that an incident surface and a light folding portion are alternated at each edge surface and the incident surfaces and light folding portions 80 are alternated between the opposite edge surfaces.

Besides, although the incident surfaces of the diffuser 20 and the light folding portions 80 (reflecting surfaces f81) are each tightly arranged along the edge surfaces. In this case, they may be arranged at different positions in the thickness direction of the diffuser 20. In this case, the one or more light sources 10 disposed at one of the edge surfaces may cause light Li to enter so that the light Lt is guided from the incident surface disposed at the edge surface to the light folding portion 80 at the opposite edge surface.

Also, although the illustration is omitted, two or more lighting units 100 may be stacked so that the traveling directions of the lights Li are different. Thereby, it is possible to arrange the light sources 10 in arbitrary two or more directions from a center of the diffuser 20. In this case, multiple light sources 10 may be provided to correspond to area(s) in which the sunlight reproducer 60 is provided.

<<Advantages of Light Folding Portion 80>>

By emitting light reflected by the light folding portion 80 through the sunlight reproducer 60, it is possible to use light that is guided in the diffuser 20, is emitted through the side surface f21, and would result in loss, leading to improvement of the light use efficiency.

Moreover, for example, in a case where an increase in thickness of the lighting device 230 due to provision of the sunlight reproducer 60 is not allowed, such as in the case of a sunroof of a mobile body, or in other cases, the folding portion 80 may serve also as the sunlight reproducer 60. For example, by providing the side surfaces f21a, f21c, and f21d of the diffuser 20 with folding portions 80, it is possible to have the light folding portions 80 serve also as the sunlight reproducer 60. FIG. 30 is a perspective view illustrating an example of the lighting device 230 in which side surfaces of the diffuser 20 are provided with folding portions 80 (at least reflecting surfaces f81) that serve also as the sunlight reproducer 60, in such a manner. In this case, the light folding portions 80 should, for example, have a deflecting function of changing the traveling direction of light reaching an edge surface opposite the incident surface so that the light is emitted toward the main emission direction side, i.e., a space facing the main light emitting surface of the diffuser 20.

When a light folding portion 80 serves also as the sunlight reproducer 60, the light folding portion 80 may have a light diffusing function in addition to the deflecting function. The light diffusing function may be provided by performing surface treatment, such as emboss processing, on the reflecting surface f81. Also, the light diffusing function may be provided by, for example, attaching, for example, a reflective and diffusive film to the reflecting surface f81, or performing white coating on the reflecting surface f81. Also, the light diffusing function may be provided by, for example, including particles in a space between the reflecting surface f81 and the emission surface. The particles may be particles 202 of the diffuser 20. In this case, it can be said that the diffuser 20 serves as both the light folding portion 80 and the sunlight reproducer 60. It can also be said that the diffuser 20 includes, as its elements, the light folding portion 80 and sunlight reproducer 60.

Also, a light diffusing function may be provided to an emission surface of the light folding portion 80 that emits the folded light (the emission surface corresponding to an edge portion of the front surface f22 of the diffuser 20 when the light folding portion 80 is formed integrally with the diffuser 20, and a region through which the folded light is emitted being referred to below as the emission surface f82). The light diffusing function may be provided by performing surface treatment, such as emboss processing, or light diffusing coating on the emission surface f82, or attaching a light diffusing film to the emission surface f82.

The example illustrated in FIG. 30 is an example in which folding portions 80 are provided to three side surfaces. However, by providing the reflecting surface f81 by mean of a half mirror or the like, it is possible to provide all the edge surfaces with light folding portions 80.

Second Embodiment

Figure 31:
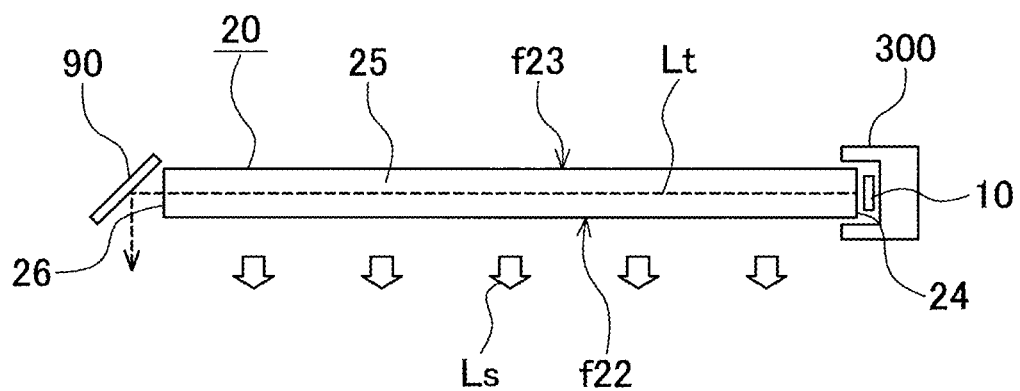
FIG. 31 is a cross-sectional view illustrating a general configuration of a lighting device according to a second embodiment.

FIG. 31 is an explanatory diagram illustrating an example of a configuration of a lighting device 240 according to a second embodiment. The lighting device 240 includes one or more light sources 10, a diffuser 20, a frame 300, and a light extractor 90. Hereinafter, elements that are the same as those of the lighting devices 200, 210, 220, and 230 are given the same reference characters, and description thereof will be omitted.

In the lighting device 240, the diffuser 20 includes a light incident surface 24 as a light incident portion, a light guiding and diffusing portion 25, a front surface f22 and a back surface f23 that are scattered light emission portions (first light emission surfaces), and a second light emission surface 26 as a transmitted light emission portion. In this example, a portion of the diffuser 20 that includes a medium and light scattering particles, and guides incident light and scatters it with the particles 202 to generate scattered light is referred to as a light guiding and diffusing portion.

The light incident surface 24 receives light emitted from the light emitting surfaces f11 of the light sources 10. The light guiding and diffusing portion 25 includes a base material 201 as the medium, and multiple light scattering particles (particles 202) present in the base material 201. The light guiding and diffusing portion 25 guides the received light and scatters it with the particles 202 to generate light Ls. For example, the diffuser 20 includes the light incident surface 24 at an edge portion of the light guiding and diffusing portion 25, and the second light emission surface 26 at an edge portion opposite the light incident surface 24. The light sources 10 are disposed at an edge portion of the diffuser 20, and light emitted from the light emitting surfaces f11 of the light sources 10 enters the light guiding and diffusing portion 25 through the light incident surface 24.

Light entering the light guiding and diffusing portion 25 is guided in the light guiding and diffusing portion 25, and emitted through the second light emission surface 26. Light emitted from the light emitting surfaces f11 of the light sources 10 enters the light guiding and diffusing portion 25 through the light incident surface 24, is guided in the light guiding and diffusing portion 25, scattered by the particles 202 as the light scattering particles contained in the light guiding and diffusing portion 25, and emitted as light Ls through the front surface f22, which is a first light emission surface, or the like. The correlated color temperature of the light emitted through the second light emission surface 26 is lower than the correlated color temperature of the light emitted through the front surface f22.

Here, at least part of the light emitted through the second light emission surface 26 is emitted in the same direction (in the example of FIG. 31, a direction that is perpendicular to the light guiding direction and toward a space facing the front surface f22 that is a main emission surface) as the light Ls, by the light extractor 90 provided near the second light emission surface 26. The light extractor 90 has, for example, a lens, a mirror, a film, a surface coating, or the like formed therein to control refraction, reflection, diffusion, transmission, or the like of the emitted light (i.e., the emitted light guided in the light guiding and diffusing portion 25 and emitted through the second light emission surface 26), and has a function of directing the emitted light emitted through the second light emission surface 26 in a particular direction. In the example of FIG. 31, the particular direction is a direction (−Y direction) perpendicular to the light guiding direction and toward a space facing the front surface f22, and is, for example, a direction toward a viewing side. The particular direction may be, for example, a direction (+Y direction) perpendicular to the light guiding direction and toward a space (anti-viewing side) facing the back surface f23.

In a specific example, the light emitted through the second light emission surface 26 is scattered light spreading in an angular direction, and in order to deflect the light in the particular direction to bring it toward a room, the light extractor 90 is a mirror, and a reflecting surface of the mirror has a curvature. With such a configuration, the light reflected by the light extractor 90 can be controlled to be substantially parallel light and travel in the particular direction toward the front surface f22 side.

Also, to provide a configuration that does not dazzle a person who is present on the front surface f22 side and looks at the light extractor 90, it is preferable to provide the light extractor 90 with a diffusing function, for example. In this case, it is possible to provide light diffused by the light extractor 90 to the front surface f22 side while reducing dazzling of a person.

The light extractor 90 may be provided as a modification of the above-described light folding portion 80, or provided separately from the above-described light folding portion 80.

Third Embodiment

Figure 32:
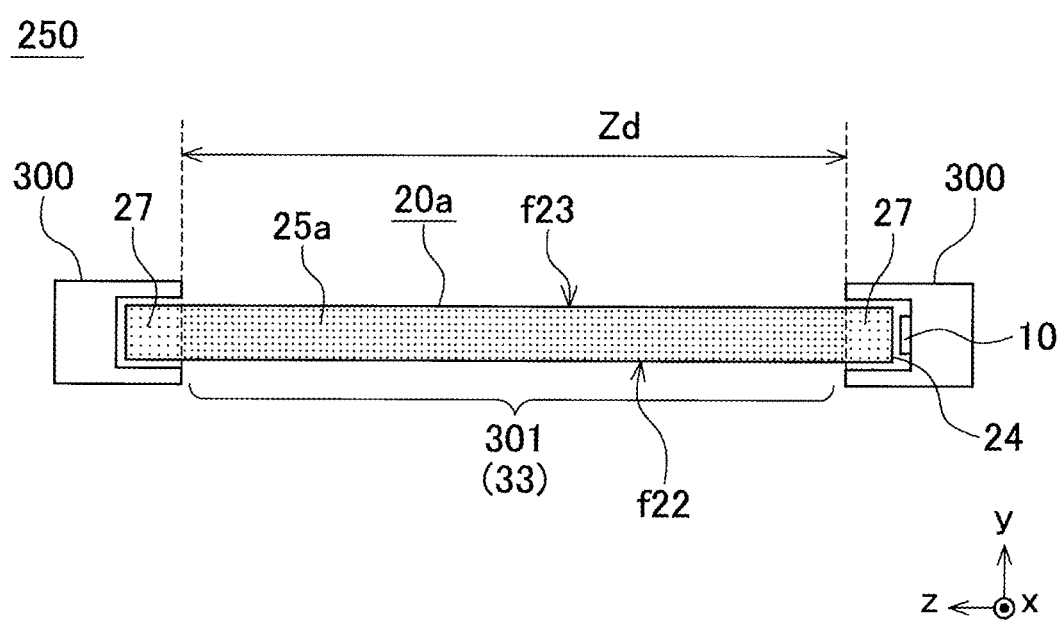
FIG. 32 is a cross-sectional view illustrating a general configuration of a lighting device according to a third embodiment.

FIG. 32 is a cross-sectional view schematically illustrating a configuration of a lighting device 250 according to a third embodiment. The following describes an example in which a diffuser 20a has a distribution of particle concentration (i.e., the number N (number/mm$^3$) of particles 202 per unit volume) therein (more specifically in a light guiding and diffusing portion 25a).

As illustrated in FIG. 32, the lighting device 250 includes one or more light sources 10, the diffuser 20a, and a frame 300 having an opening (e.g., an opening 33 illustrated in FIG. 7) corresponding to a region 301. Hereinafter, elements that are the same as those of the lighting devices 200, 210, 220, 230, and 240 are given the same reference characters, and description thereof will be omitted.

The lighting device 250 employs an edge incidence system in which the light sources 10 are disposed to face a light incident surface 24 that is a side surface located at an edge portion of the diffuser 20a. The diffuser 20a includes the light incident surface 24, the light guiding and diffusing portion 25a, and a front surface f22 and a back surface f23 as first light emission surfaces.

The light incident surface 24 receives light emitted from the light emitting surfaces f11 of the light sources 10. The light guiding and diffusing portion 25a includes a base material 201 as a medium, and multiple particles 202 present in the base material 201. The light guiding and diffusing portion 25a guides the received light and scatters it with the particles 202 to generate light Ls. Light Ls is emitted through the opening 33 of the frame 300.

The diffuser 20a may include at least one region 27 in which the concentration of the particles 202 is low, near at least one side surface. As illustrated in FIG. 32, when the area of the front surface f22 of the light guiding and diffusing portion 25a is larger than the area of the opening 33 provided in the lighting device 250, by providing the region 27 that cannot be seen through the opening 33 as a region in which the concentration of the particles 202 is low, it is possible to reduce light emission by the region 27 and improve the light use efficiency of the entire lighting device 250. Specifically, by setting the concentration of the particles 202 in the region 27 of the light guiding and diffusing portion 25a that cannot be seen through the opening 33 to be lower than the concentration of the particles 202 in a region of the light guiding and diffusing portion 25a that can be seen through the opening 33, the scattering probability in the region can be reduced, and thus the light use efficiency is improved in extracting light of a desired blue color as illumination light from the incident light or extracting transmitted light at an edge portion opposite the incident surface, or other portions, as illumination light or light simulating the sunlight.

Also, the region 27 may be at least one region that includes no particles 202 and is provided near at least one side surface of the light guiding and diffusing portion 25a. For example, in the example of FIG. 32, it is possible to provide a region 27 including no particles 202 in a portion of the light guiding and diffusing portion 25a that is not seen through the opening 33. Even in this case, it is possible to reduce light emission at the region 27, and improve the light use efficiency of the entire lighting device 250.

Since the region 27 that cannot be seen through the opening 33 is not used for the purpose of emitting scattered light Ls simulating the blue sky, the length of the light guiding and diffusing portion 25a excluding the region 27 in the light guiding direction (Z direction) can be taken as the above-described Zd. Also, when the region 27 is a region including no particles 202, the light incident surface 24 need not necessarily be provided at an edge portion of the light guiding and diffusing portion 25a. Specifically, the diffuser 20a may have a configuration different from the configuration illustrated in FIG. 32 as long as it has a configuration in which light is incident on the light guiding and diffusing portion 25a through the region 27. It is more preferable that the region 27 including no particles 202 be provided at an edge portion other than an edge portion at which the light incident surface 24 is provided, in that the intensity and direction of the guided light can be accurately controlled.

For example, when the light incident surface 24 is provided at the side surface f21a of FIG. 5, the diffuser 20a may have regions 27 provided at an edge portion on the side surface f21b side, an edge portion on the side surface f21c side, and an edge portion on the side surface f21d side. Also, for example, when light incident surfaces 24 are provided at the side surfaces f21a and f21b of FIG. 5, the diffuser 20a may have regions 27 provided at an edge portion on the side surface f21c side and an edge portion on the side surface f21d side.

Also, the above-described length Zd may be taken as a length of the light guiding and diffusing portion 25a excluding the region 27. For example, the length Zd of the light guiding and diffusing portion 25a in an optical axis direction of the light sources 10 may be taken as a length of the light guiding and diffusing portion 25a excluding the region 27 in the optical axis direction.

Even when a region of the diffuser 20 cannot be seen through the opening 33, if it has a purpose, such as supplying light Ls to the sunlight reproducer 60 or light folding portion 80 as described above, the region can be excluded from the above region 27. In other words, for a region of the diffuser 20 that cannot be seen through the opening 33 or does not have any other purposes, such as providing scattered light to the sunlight reproducer 60 or light folding portion 80, the concentration of the particles 202 can be made lower than that of the other region to reduce or prevent the generation of scattered light.

The above-described embodiments may use terms, such as "parallel" or "perpendicular", indicating the positional relationships between parts or the shapes of parts. These terms are intended to include ranges taking account of manufacturing tolerances, assembly variations, or the like. Thus, recitations in the claims indicating the positional relationships between parts or the shapes of parts are intended to include ranges taking account of manufacturing tolerances, assembly variations, or the like.

Also, although embodiments of lighting devices, windows with lighting functions, and building products for windows according to the present disclosure have been described as above, lighting devices, windows with lighting functions, and building products for windows according to the present disclosure are not limited to these embodiments.

REFERENCE SIGNS LIST 100 lighting unit
200, 210, 220, 230, 240, 250 lighting device
10 light source
12 substrate
13 LED element (light emitting element)
20, 20a diffuser
f21 side surface (edge surface)
f22 front surface (first surface)
f23 back surface (second surface)
24 light incident surface
25, 25a light guiding and diffusing portion
26 second light emission surface
201 base material
202 particle
300 frame
301 region (window region)
31, 32 frame portion
33, 37 opening
35, 36, 39 groove
38 joint
f31 first surface f32 second surface
f33 outer surface
f34 inner surface
f351 bottom surface (of groove 35)
f352 side surface (of groove 35)
f361 bottom surface (of groove 36)
f362 side surface (of groove 36)
400 mobile body
402 sunroof
403 window
40 installation body
50 light shield plate (light shield)
51 door pocket
52 back plate
60 sunlight reproducer
70 auxiliary light source
72 substrate
73 LED element (light emitting element)
80 light folding portion (deflector)
90 light extractor

The invention claimed is:

1. A lighting device comprising:
a first light source to emit first light;
a diffuser to receive the first light and emit scattered light; and
a frame to support the first light source and the diffuser, wherein
the diffuser includes nanoparticles, and guides the received first light, scatters the first light with the nanoparticles, and emits the first light as the scattered light,
the diffuser includes a light incident surface to receive the first light, a first surface on which a first light emission surface to emit the scattered light is formed, and a second surface opposite the first surface,
the light incident surface is formed at a first edge portion of the diffuser,
the frame is opened to expose at least a portion of a region on the first surface of the diffuser in which the first light emission surface is formed and a region on the second surface corresponding thereto, and
a correlated color temperature of the scattered light is higher than a correlated color temperature of the first light.

2. The lighting device of claim 1, wherein a haze of the diffuser in a thickness direction that is a normal direction of the first surface is not less than 0.1% and not more than 15%.

3. The lighting device of claim 1, wherein the first light emission surface is formed on at least one surface connected to the first edge portion and a second edge portion at which the first light received through the light incident surface is guided and arrives.

4. The lighting device of claim 1, wherein the lighting device includes, as the first light source, a plurality of light sources to emit lights having at least two different color temperatures.

5. The lighting device of claim 1, wherein the frame is constituted by two or more separable structural bodies.

6. The lighting device of claim 5, wherein
the frame includes a first frame portion and a second frame portion that are separable from each other,
the first frame portion supports the diffuser, and
the second frame portion supports the first light source.

7. The lighting device of claim 5, wherein
the frame includes a first frame portion and a second frame portion that are separable from each other,
the first frame portion supports the diffuser and the first light source,
the second frame portion supports the first frame portion in an installed state, and includes a power feeder to supply electrical power to the first light source, and
the first frame portion includes a power receiver to receive the electrical power supplied from the power feeder.

8. The lighting device of claim 1, wherein a back plate that is an opaque structural body is provided on a second surface side of the diffuser in an openable and closable manner.

9. The lighting device of claim 1, wherein a sunlight reproducer including a light emitting surface to reproduce sunlight is provided on a first surface side of the diffuser.

10. The lighting device of claim 9, wherein a second light source is provided between the sunlight reproducer and the diffuser.

11. The lighting device of claim 1, wherein a deflector to change a traveling direction of the first light is provided in at least one edge surface of the diffuser or an inner surface of the frame facing the edge surface.

12. The lighting device of claim 1, wherein a light shield to block external light is provided on at least one of a first surface side and a second surface side of the diffuser.

13. The lighting device of claim 1, wherein the frame supports the diffuser in an openable and closable manner.

14. The lighting device of claim 1, wherein
the diffuser includes a second light emission surface disposed opposite the light incident surface, the second light emission surface emitting light guided in the diffuser, and
the lighting device further comprises a light extractor to deflect the light emitted through the second light emission surface, toward a space facing the first light emission surface.

15. The lighting device of claim 1, wherein the diffuser includes two or more regions having different particle concentrations.

16. The lighting device of claim 15, wherein the diffuser includes, at an edge portion other than an edge portion at which the light incident surface is provided, a region having a smaller particle concentration than another region.

17. A window with a lighting function used as a window of a building or a mobile body, the window comprising:
a diffuser to receive first light and emit scattered light; and
a frame to support the diffuser, wherein
the diffuser includes nanoparticles, and guides the received first light, scatters the first light with the nanoparticles, and emits the first light as the scattered light,
the diffuser includes a light incident surface to receive the first light, a first surface on which a first light emission surface to emit the scattered light is formed, and a second surface opposite the first surface,
the light incident surface is formed at a first edge portion of the diffuser,
the frame is opened to expose at least a portion of a region on the first surface of the diffuser in which the first light emission surface is formed and a region on the second surface corresponding thereto, and
a correlated color temperature of the scattered light is higher than a correlated color temperature of the first light.

18. The window with the lighting function of claim 17, further comprising a first light source to emit the first light, wherein the frame supports the first light source and the diffuser.

19. A building product for a window comprising:
a first light source to emit first light;
a diffuser to receive the first light and emit scattered light; and
a frame to support the first light source and the diffuser, wherein
the diffuser includes nanoparticles, and guides the received first light, scatters the first light with the nanoparticles, and emits the first light as the scattered light,
the diffuser includes a light incident surface to receive the first light, a first surface on which a first light emission surface to emit the scattered light is formed, and a second surface opposite the first surface,
the light incident surface is formed at a first edge portion of the diffuser,
the frame is opened to expose at least a portion of a region on the first surface of the diffuser in which the first light emission surface is formed and a region on the second surface corresponding thereto, and
a correlated color temperature of the scattered light is higher than a correlated color temperature of the first light.

* * * * *